United States Patent
Burfeind et al.

(10) Patent No.: US 6,360,172 B1
(45) Date of Patent: Mar. 19, 2002

(54) GENERATION AND DISTRIBUTION OF PERSONALIZED MULTIMEDIA NATURAL-PHENOMENOLOGICAL INFORMATION

(75) Inventors: Craig Burfeind, Chanhassen; Douglas P. Kruhoeffer, Eden Prairie; Anthony W. Meys, Lakeville; Peter Resch, Albertville, all of MN (US)

(73) Assignee: Digital Cyclone, Inc., Minnetonka, MN (US)

(*) Notice: Subject to any disclaimer, the term of this patent is extended or adjusted under 35 U.S.C. 154(b) by 0 days.

(21) Appl. No.: 09/374,168

(22) Filed: Aug. 13, 1999

(51) Int. Cl.[7] ............................................. G06F 19/00
(52) U.S. Cl. ............................................ 702/2; 455/414
(58) Field of Search ..................... 702/2, 3; 340/905, 340/825; 455/414; 709/208

(56) References Cited

U.S. PATENT DOCUMENTS

| | | | | |
|---|---|---|---|---|
| 5,555,446 A | * | 9/1996 | Jasinski | 455/54.2 |
| 5,870,030 A | * | 2/1999 | DeLuca et al. | 340/825.44 |
| 6,052,648 A | * | 4/2000 | Burfeind et al. | 702/3 |

OTHER PUBLICATIONS

*Federal Meteorological Handbook No. 1 Surface Weather Observation and Reports*, Office of the Federal Coordinator for Meteorological Services and Supporting Research, Silver Spring, MD, 87 p., (Dec. 1995).

Dey, C.H., *The WMO Format For The Storage Of Weather Product Information And The Exchange Of Weather Product Messages In Gridded Binary Form As Used By NCEP Central Operations, Edition I*, Office Note 388—GRIB, National Centers for Environmental Prediction Central Operations, 105 p., (Mar. 10, 1998).

\* cited by examiner

*Primary Examiner*—Jay Patidar
*Assistant Examiner*—Victor J. Taylor
(74) *Attorney, Agent, or Firm*—Schwegman, Lundberg, Woessner & Kluth P.A.

(57) ABSTRACT

Natural-phenomenological information is personalized to the unique requirements of a subscriber and distributed to the subscriber. Natural-phenomenological data is gathered from a variety of sources, such as current ground observations, forecast conditions, satellite images, and radar data. Personal preferences of the subscribers are also gathered and stored, such as activities of the subscriber, geographic locations of the activities, sensitivities of the subscriber to natural-phenomenological conditions, calendar information of the subscriber, and modes of delivery. The personal preferences of the subscriber are used as a filter to identify the natural-phenomenological data that is particularly useful to the subscriber, and the resulting information is delivered to the subscriber. The subscriber identifies the destination device that the information is delivered to. The invention is extensible to support new sources of natural-phenomenological information and new output devices. Electronic delivery of the personalized natural-phenomenological information can be through any number of a variety of output mediums, including pagers, text to voice synthesizers to create an audio stream for playback either via a telephone or a personal digital assistant (PDA), a multimedia-enabled computer, email, computer display monitors, PDA, and a PCS phone.

39 Claims, 17 Drawing Sheets

GENERATION AND DISTRIBUTION OF PERSONALIZED MULTIMEDIA NATURAL-PHENOMENOLOGICAL INFORMATION

FIELD OF THE INVENTION

The present invention relates generally to client/server multimedia applications and more specifically to generation and distribution of personalized multimedia natural-phenomenological information.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999, Digital Cyclone Corporation, All Rights Reserved.

BACKGROUND OF THE INVENTION

In recent years, natural-phenomenological information has become increasingly important. Natural-phenomenological data is collected almost instantaneously from numerous sources. For example, natural meteorological data is collected from a multitude of individual sites scattered across the world, such as airports, and hydrological data is collected from nearly all of the rivers in the United States. Consumer interest in natural-phenomenological information has also increased as a result of increased participation in outdoor activities and increasingly damaging natural phenomena, such as hurricanes, tornadoes and floods.

Furthermore, systems for electronic distribution of natural-phenomenological information are commonly available today. Such conventional systems typically include a computer software program running on a client computer that displays periodically reported natural-phenomenological information provided by the National Weather Service through a direct telephone line dial up connection or an Internet connection. The natural-phenomenological information conventionally includes, past, present and forecast meteorological conditions for a number of specific geographic locations including meteorological measures of

- temperature
- relative humidity
- wind direction and speed
- barometric pressure
- wind chill
- dew point
- precipitation activity
- cloud coverage
- satellite images
- radar images
- aviation-related information warnings and watches of dangerous natural phenomena such as

- floods
- tornadoes
- hurricanes
- hail size
- speed and direction of the movement of storm cells
- wind gusts within storm cells
- supercell type
- avalanches
- brush fires and forecasts for the local geographic area and the geographic region. Natural-phenomenological information also includes tide cycles, hydrological measures of lakes and rivers, seismological reports and forecasts, and ski area snow condition reports, and cosmological events such as sunrise, sunset, and moon phases.

The software programs that display the information include, widely available browsers, platform independent applets, or custom-programmed graphical user interfaces. Server processes are implemented to support the distribution of information to client computers.

All of the above systems provide natural-phenomenological information regardless of the particular needs of the consumer. However, consumers of natural-phenomenological information typically are interested only in a portion of the large amount of natural-phenomenological information that is available. The process of filtering through the large amount of natural-phenomenological information in order to retrieve the specific information that the consumer is interested in and performing a manual qualitative analysis of the information is difficult and inefficient for the consumer. For example, leisure sailors may be primarily interested in wind and tide conditions and golfers may be primarily interested in precipitation and sun intensity. Non-commercial pilots may be particularly interested in conditions at altitudes that few others are interested in. Furthermore, people with particular health conditions may be primarily interested in ozone measurements and pollen count. In addition, skiers may be specifically interested in ski conditions and avalanche reports and campers may be only interested in brush fire reports. Other individuals may only be interested seismological information. Finally, people who work outdoors may be particularly interested in heat index and wind chill.

Prior art products fail to solve the problem of providing customized generation of natural-phenomenological data tailored to an individual. Therefore, there is a need for the generation and distribution of personalized multimedia natural-phenomenological information.

SUMMARY OF THE INVENTION

The above-mentioned shortcomings, disadvantages and problems are addressed by the present invention, which will be understood by reading and studying the following specification.

Natural-phenomenological information is personalized to the unique requirements of a subscriber and distributed to the subscriber. Personalized meteorological information is generated and distributed by receiving natural-phenomenological data from a source device, receiving predetermined criteria for selecting natural-phenomenological data is received, in which the predetermined criteria comprises information that describes at least one activity, a portion of the natural-phenomenological data based on the predetermined criteria is selected; and the portion is transmitted to destination device. The receiving of natural-phenomenological data can occur before, in parallel or after the receiving of predetermined criteria. In another aspect, the portion transmitted is encoded so that the portion is in compliance with the destination device medium capabilities, functions and features.

More specifically, natural-phenomenological data is gathered from a variety of sources, such as current ground observations, forecast conditions, satellite images, and radar data. Personal preferences of the subscribers are also gathered and stored, such as activities of the subscriber, geographic locations of the activities, sensitivities of the subscriber to natural phenomena, calendar information of the subscriber, and modes of delivery. The personal preferences of the subscriber are used as a filter to identify the natural-phenomenological data that is particularly useful to the subscriber, and the resulting information is delivered to the subscriber. The subscriber identifies the destination device that the information is delivered to. The invention is extensible to support new sources of natural-phenomenological information and new output devices. Electronic delivery of the personalized natural-phenomenological information can be through any number of a variety of output mediums, including pagers, text to voice synthesizers to create an audio stream for playback either via a telephone or a personal digital assistant (PDA), a multimedia-enabled computer, email, computer display monitors, PDA, and a PCS phone.

The present invention has the advantage relieving the subscriber of the task of using less efficient methods of gathering natural-phenomenological information that addresses the specific needs of each individual subscriber.

The present invention also has the advantage of delivering the natural-phenomenological information in a manner that is in compliance with, and makes use of the capabilities, functions and features of the device and communication mediums of the subscriber.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of the exemplary embodiments, reference is made to the accompanying drawings which form a part hereof, and in which is shown by way of illustration specific exemplary embodiments in which the inventions can be practiced. These embodiments are described in sufficient detail to enable those skilled in the art to practice the invention, and it is to be understood that other embodiments can be utilized and that logical, mechanical and electrical changes can be made without departing from the scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular object-oriented implementation of the invention is described. Finally, in the fifth section, a conclusion of the detailed description is provided.

Hardware and Operating Environment

Figure 1:
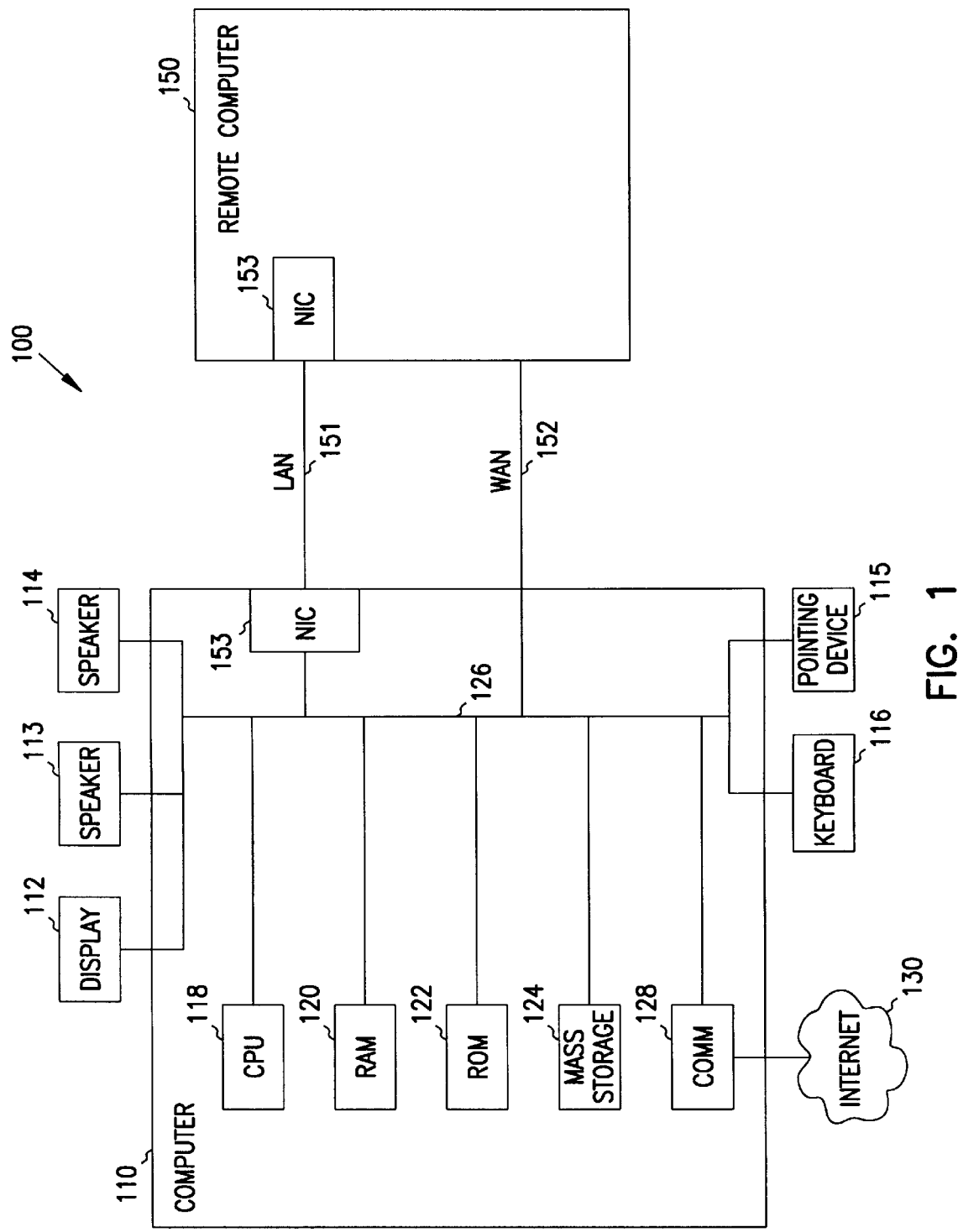
FIG. 1 is a block diagram of the hardware and operating environment in which different embodiments of the invention can be practiced.

FIG. 1 is a block diagram of the hardware and operating environment 100 in which different embodiments of the invention can be practiced. The description of FIG. 1 provides an overview of a conventional computer hardware and a suitable computing environment in conjunction with which the invention can be implemented. The invention is described in terms of a computer executing computer-executable instructions. However, the invention can be embodied entirely in computer hardware in which the computer-executable instructions are implemented in read-only memory. The invention can also be implemented in client/server computing environments where remote devices that are linked through a communications network perform tasks. Program modules can be located in both local and remote memory storage devices in a distributed computing environment.

Computer 110 is operatively coupled to display device 112, pointing device 114, and keyboard 116. Computer 110 includes a processor 118 (e.g. an Intel Pentium processor), random-access memory 120 (RAM), read-only memory 122 (ROM), and one or more mass storage devices 124, and a system bus 126, that operatively couples various system components including the system memory to the processing unit 118. Mass storage devices are more specifically types of nonvolatile storage media and can include a hard disk drive, a floppy disk drive, an optical disk drive, and a tape cartridge drive. The memory 120, 122, and mass storage devices, 124, are types of computer-readable media. A user can enter commands and information into the personal computer 110 through input devices such as a pointing device 115 and a keyboard 116. Other input devices (not shown) can include a microphone, joystick, game pad, satellite dish, scanner, or the like. The processor 118 executes computer programs stored on the computer-readable media. The invention is not limited to any type of computer 110. Computer 110 can be a PC-compatible computer, a MacOS-compatible computer or a UNIX-compatible computer. The construction and operation of such computers are well known within the art.

Furthermore, computer 110 can be communicatively connected to the Internet via a communication device 128. Internet 130 connectivity is well known within the art. In one embodiment, the computer includes a communication device that is a modem and corresponding communication drivers to connect to the Internet via what is known in the art as a "dial-up connection." In another embodiment, the computer includes a communication device that is an Ethernet or similar hardware (network) card connected to a local-area network (LAN) that itself is connected to the Internet via what is known in the art as a "direct connection" (e.g., T1 line, etc.).

Computer 110 also has at least one operating environment running thereon, each desirably providing a graphical user interface including a user-controllable pointer. Such operating environments include operating systems such as versions of the Microsoft Windows and Apple MacOS operating systems well-known in the art. The invention is not limited to any particular operating environment, however, and the construction and use of such operating environments are well known within the art. Computer 110 also desirably can have at least one web browser application program running within at least one operating environment, to permit users of computer 110 to access intranet or Internet world-wide-web pages as addressed by Universal Resource Locator (URL) addresses. Such browser application programs include Netscape Navigator and Microsoft Internet Explorer.

Display device 112 permits the display of information, including computer, video and other information, for viewing by a user of the computer. The invention is not limited to any particular display device 112. Such display devices include cathode ray tube (CRT) displays (monitors), as well as flat panel displays such as liquid crystal displays (LCD's). Display device is connected to the system bus 126. In addition to the monitor, computers typically include other peripheral output devices such as printers (not shown), speakers, pointing devices and a keyboard. Speakers 113 and 114 enable the audio output of signals. Speakers 113 and 114 are also connected to the system bus 126. Pointing device 115 permits the control of the screen pointer provided by the graphical user interface (GUI) of operating systems such as versions of Microsoft Windows. The invention is not limited to any particular pointing device 115. Such pointing devices include mouses, touch pads, trackballs, remote controls and point sticks. Finally, keyboard 116 permits entry of textual information into computer 110, as known within the art, and the invention is not limited to any particular type of keyboard.

The computer 110 can operate in a networked environment using logical connections to one or more remote computers, such as remote computer 150. These logical connections are achieved by a communication device coupled to or a part of the computer 110; the invention is not limited to a particular type of communications device. The remote computer 150 can be another computer 110, a server, a router, a network PC, a client, a peer device or other common network node. The logical connections depicted in FIG. 1 include a local-area network (LAN) 151 and a wide-area network (WAN) 152. Such networking environments are commonplace in offices, enterprise-wide computer networks, intranets and the Internet.

When used in a LAN-networking environment, the computer 110 and remote computer 150 are connected to the local network 151 through a network interface or adapter 153, which is one type of communications device. When used in a conventional WAN-networking environment, the computer 110 and remote computer 150 communicate with a WAN 152 through modems (not shown). The modem, which can be internal or external, is connected to the system bus 126. In a networked environment, program modules depicted relative to the personal computer 110, or portions thereof, can be stored in the remote memory storage device.

System Level Overview

A system level overview of the operation of an exemplary embodiment of the invention is described by reference to FIG. 2. The personal natural-phenomenological system 230 receives personal preference data of a subscriber 210 and natural-phenomenological data 220. Natural-phenomenoogical data includes radar data. The personal natural-phenomenological system 230 can receive personal preference data of a subscriber 210 before, after, or at the same time as the natural-phenomenological data 220 is received. Subsequently, the personal natural-phenomenological system 230 uses the personal preference data 210 as a guide to select or filter natural-phenomenological data 220 that is pertinent to the subscriber. The personal natural-phenomenological system 230 can be implemented on a computer such as computer 110 in FIG. 1. Thereafter, the personal natural-phenomenological system 230 sends the selected natural-phenomenological data to the output medium or device 240 for communication to the subscriber. Electronic delivery of the personalized natural-phenomenological information can be through any number of a variety of output mediums, including pagers, text to voice synthesizers to create an audio stream for playback either via a telephone or a personal digital assistant (PDA), a multimedia-enabled computer, email, computer display monitors, PDA, and a PCS phone. One of skill in the art will readily recognize that the invention can be applicable to future communication devices.

The system level overview of the operation of an exemplary embodiment of the invention has been described in this section of the detailed description.

Methods

In the previous section, a system level overview of the operation of an exemplary embodiment of the invention was described. In this section, a particular method performed by the server and the clients of such an exemplary embodiment are described by reference to a series of flowcharts. The methods performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media).

Figure 3:
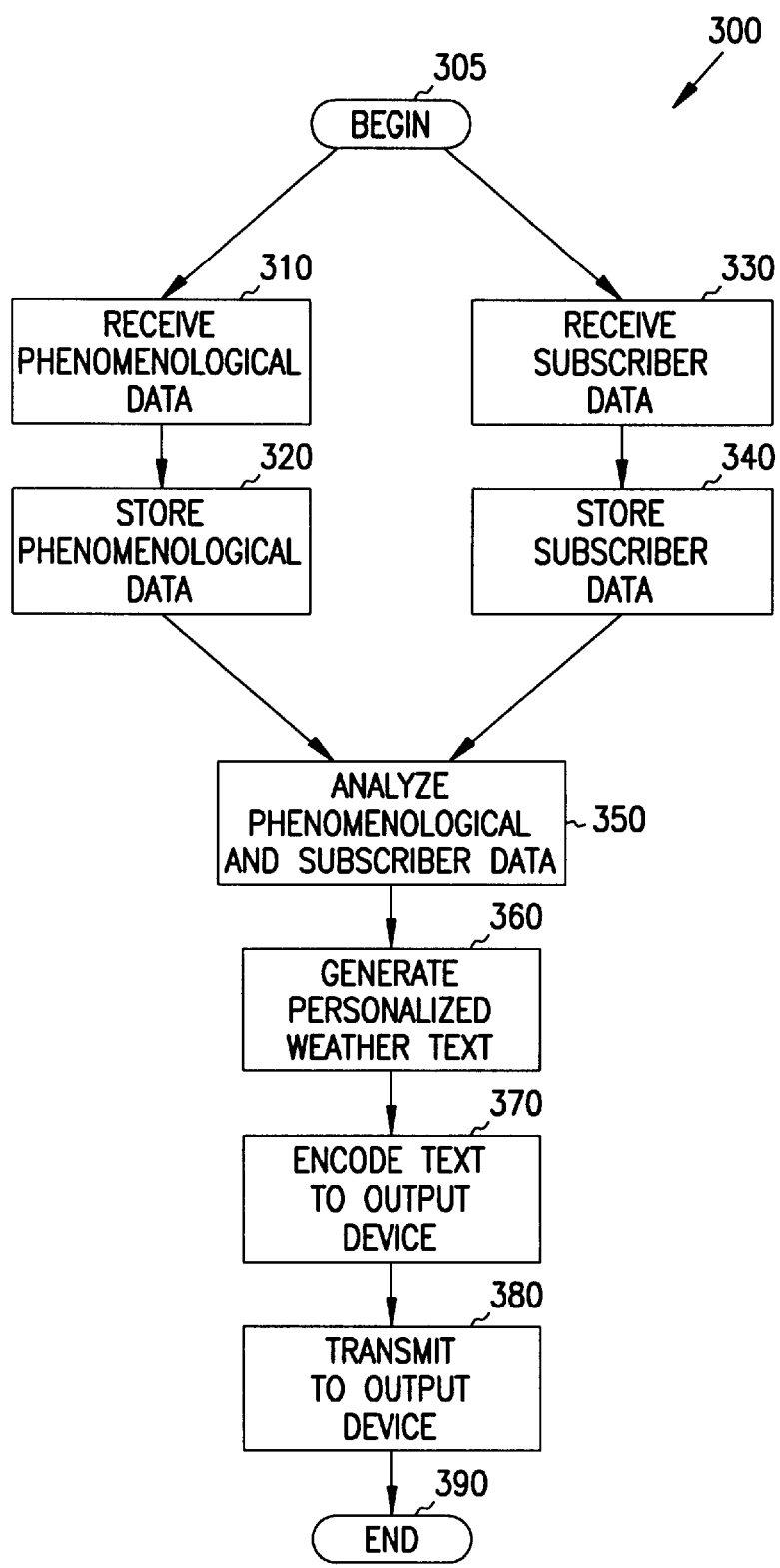
FIG. 3 is a block diagram of one embodiment method of the invention for personal natural-phenomenological info.

FIG. 3 is a block diagram of one embodiment of the method 300 of the invention. In one embodiment, actions are performed on a computer 110 in FIG. 1.

Figure 2:
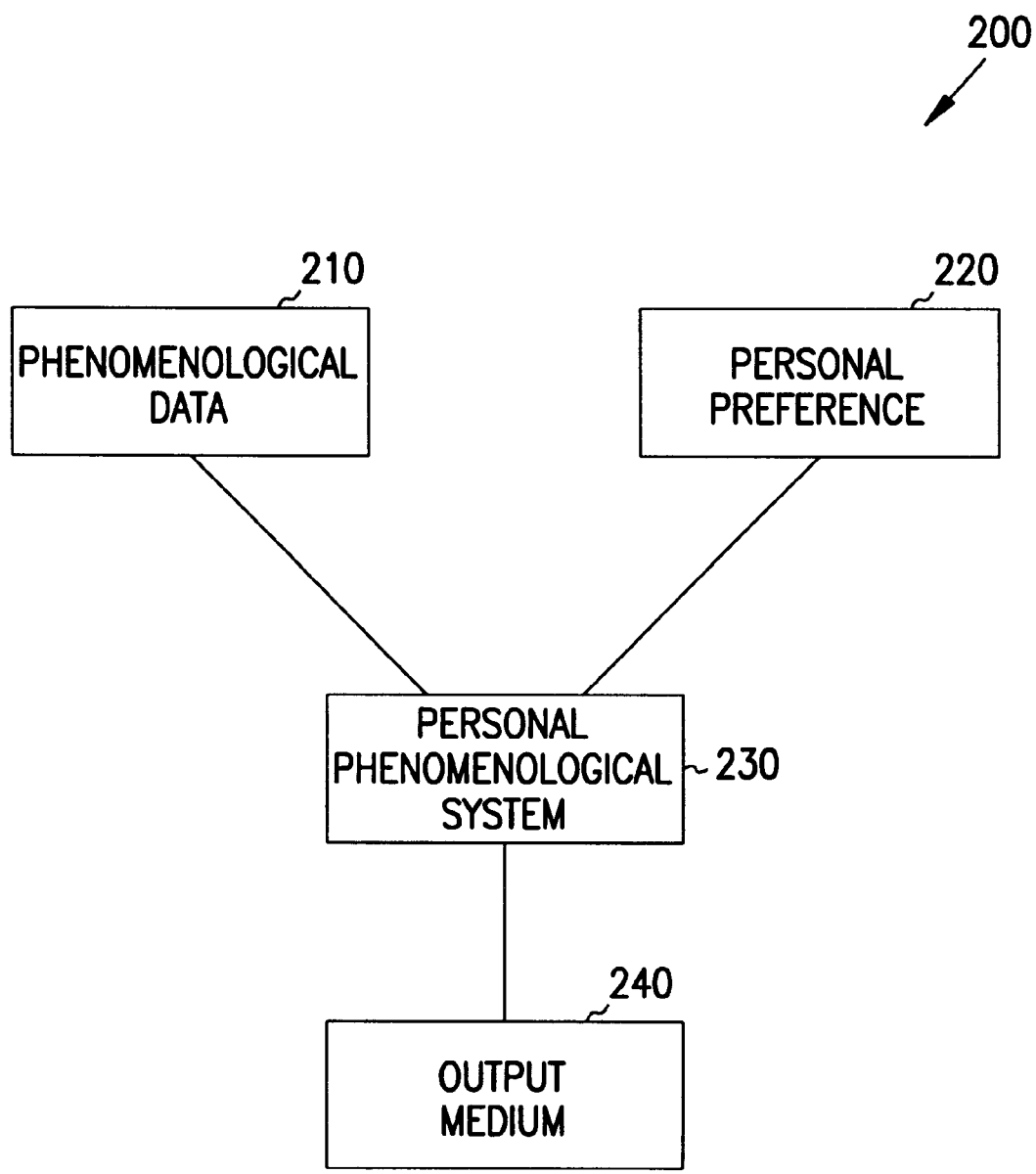
FIG. 2 is a data flow diagram of one embodiment of generating and distributing personalized multimedia natural-phenomenological information.

The method begins (block 305) with either the receipt of natural-phenomenological data (block 310) from a source of natural-phenomenological data (block 220 in FIG. 2), or the receipt of subscriber data (block 330) from a source of personal preference data of a subscriber (block 210 in FIG. 2). After the receipt of natural-phenomenological data (block 310), the natural-phenomenological data is stored (block 320). After the receipt of subscriber data (block 330), subscriber data is stored (block 340). The subscriber data is received (block 330) at the same time, before or after the natural-phenomenological data is received (block 310). After natural-phenomenological data is stored (block 320) and the subscriber data is stored (block 340), the stored natural-phenomenological data and subscriber data is analyzed (block 350) and a text string embodying the result of the analysis is generated (block 360). Afterward, the text string is encoded to the capabilities, features and functions of the output device (block 370), such as, converting the text string to a voice-synthesized audio stream, embedding the text string in a HTML-compliant text string that is in turn embedded in an HTTP-compliant email file. The analysis of natural-phenomenological and subscriber data (block 350), generation of personalized natural phenomenological text (block 360), and encoding of text to output device (block 370) are all performed by the personal natural-phenomenological system (block 230 in FIG. 2). Afterward, the encoded text is transmitted to the output device (block 380), the output medium (block 240 of FIG. 2) and the method ends (block 390).

Implementation

Figure 4:
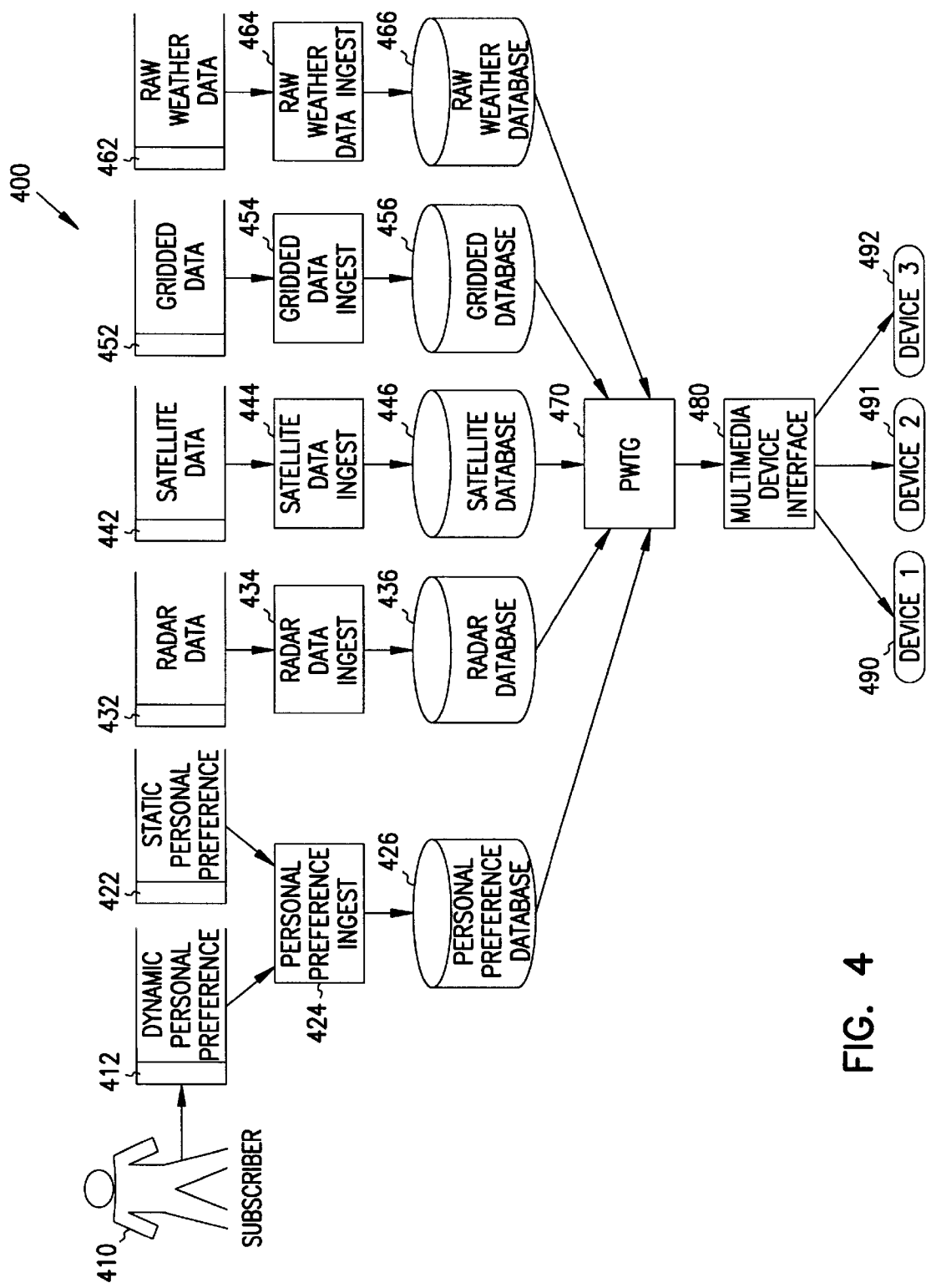
FIG. 4 is a data flow diagram of an alternative embodiment of generating and distributing personalized multimedia natural-phenomenological information.

Turning now to FIG. 4, the data flow diagram illustrates a particular implementation 400 of the method described in conjunction with FIG. 3.

The sources of data include subscriber sources and third party sources of natural-phenomenological data 432, 442, 452, 462, which are also depicted as phenomenological data 210 in FIG. 2. The subscriber 410 provides the dynamic personal preferences of the subscriber, which is also depicted as personal preference 220 in FIG. 2,. The dynamic personal preferences include information regarding the activity(ies) that the subscriber is or will be engaged in, the location(s) of the activity(ies), and the subscriber's sensitivities to natural-phenomenological conditions while engaged in the activity(ies), calender schedule information, and lastly, information describing the output device(s) of the subscriber 490, 491, 492, also depicted as output medium 240 in FIG. 2, to which will be transmitted the personalized natural-phenomenological information. The dynamic subscriber preference information and the subscriber identification are initially delivered to a repository of subscriber personal preference information 412. This repository can be in one of many physical or electronic forms, such as paper records, an electronic database or file system. Regardless of the initial form of storage of the subscriber personal preference information and the subscriber identification, the subscriber personal preference information is ultimately stored in electronic form indexed by the subscriber identification 412. More specifically, in an object-oriented software embodiment, the information and identification is stored in an object-oriented database (OODB) and in a procedural software embodiment, the information and identification is stored in relational database as well-known to one skilled in the art. OODBs are databases that will be used to describe support objects and classes that one of skill in the art will readily recognize.

Data is received from subscriber sources 410 and third party sources of natural-phenomenological data 432, 442, 452, 462 in a dynamic order; data can be received from the subscriber sources 410 before, after or during receipt of data from third party sources of natural-phenomenological data 432, 442, 452, 462. The subscriber preferences are used by the Personal Weather Text Generator (PWTG) 470, described in detail below, in combination with the natural-phenomenological data, also described in detail below, to generate personalized or customized natural-phenomenological information.

Furthermore, the invention also has a store of default static subscriber preference records 422. Default static subscriber records 422 include, identification of the subscriber, such as the subscriber's name or an alias, and an access password of the subscriber. The PWTG 470 uses information from default static subscriber preferences records 422 in the absence of dynamic subscriber personal preference records 412 for the generation of personal natural-phenomenological information for a subscriber 410. In other words, information from dynamic subscriber personal preference records 412 overrides information from the default static subscriber preference records 422. Default static subscriber preference records 422 describe assumed preferences based on generalizations. For example, a default preference 422 for a subscriber engaged in sailing indicates that information describing wind speed and direction will be generated. Therefore, in the absence of any dynamic subscriber preference 412 regarding wind speed and direction information for a subscriber engaged in the activity of sailing, the default static subscriber preference information 422 will cause the PWTG to generate information regarding wind speed and direction.

The sources of data also include third-party sources of natural-phenomenological data 210 in FIG. 2. The third-party sources of natural-phenomenological data include radar data records 432, satellite data records 442, gridded natural-phenomenological records 452, and raw natural-phenomenological records 462. The National Weather Service (NWS) of the National Oceanic and Atmospheric Administration (NOAA) is one of many organizations that are sources for this information. Radar text records 432 provide data regarding current precipitation. Satellite data records 442 provide data regarding current cloud cover. Gridded natural-phenomenological records 452 provide numerical measurement data on current conditions at a variety of altitudes and locations. Raw natural-phenomenological records 462 provide numerical ground observation measurement data on current conditions.

In one embodiment, radar data records 432 are implemented. The radar data records 432 include data on current precipitation. In another embodiment, satellite data records 442, are implemented. The satellite data records 442 include data on clouds. In yet another embodiment, gridded natural-phenomenological records 452, are implemented using gridded binary (GRIB) format. More specifically, the GRIB data is formatted according to a code form FM 94 binary universal form for the representation for natural-phenomenological data (BUFR) as published by the National Centers for Environmental Prediction (NCEP) of the National Weather Service of the National Oceanic and Atmospheric Administration of the U.S. Department of Commerce, titled "The WMO Format for the Storage of Weather Product Information and the Exchange of Weather Product Messages in Gridded Binary Form as used by the NCEP Central Operation," author Clifford H. Dey, Mar. 10, 1998.

In still another embodiment, raw natural-phenomenological records 462 are METAR data records, which are hourly ground natural-phenomenological observations. (The METAR acronym roughly translates from French as Aviation Routine Weather Report.) METAR data can be either METAR/SPECI or METAR/TAF. METAR is the international standard code format for hourly surface natural-phenomenological observations. The U.S. METAR code is described in Federal Weather Handbook (FMH) No. 1 "Surface Observations and Reports." A special report, METAR/SPECI, is merely a METAR formatted report which is issued on a non-routine basis as dictated by changing natural-phenomenological conditions. (The SPECI acronym roughly translates as Aviation Selected Special Weather Report.) METAR/TAF is the international standard code format for terminal forecasts issued for airports. (The TAF acronym translates to Aerodrome Forecast.)

The data is retrieved and stored in a database. More specifically, the personal preference ingest 424 electronically reads dynamic subscriber personal preference records 412 that are generated by the subscriber 410 and stores the dynamic subscriber personal preference records 412 in the personal preference database 426. More specifically, the static preference ingest 424 electronically reads static subscriber personal preferences records 422 and stores the static subscriber personal preference records 422 in the static preference database 426. The preference ingest 424 uses one or more instantiated personal preference objects illustrated in FIG. 5 and described in detail below from the personal preference class illustrated in FIG. 10 through FIG. 16 described in detail below.

Figure 9:
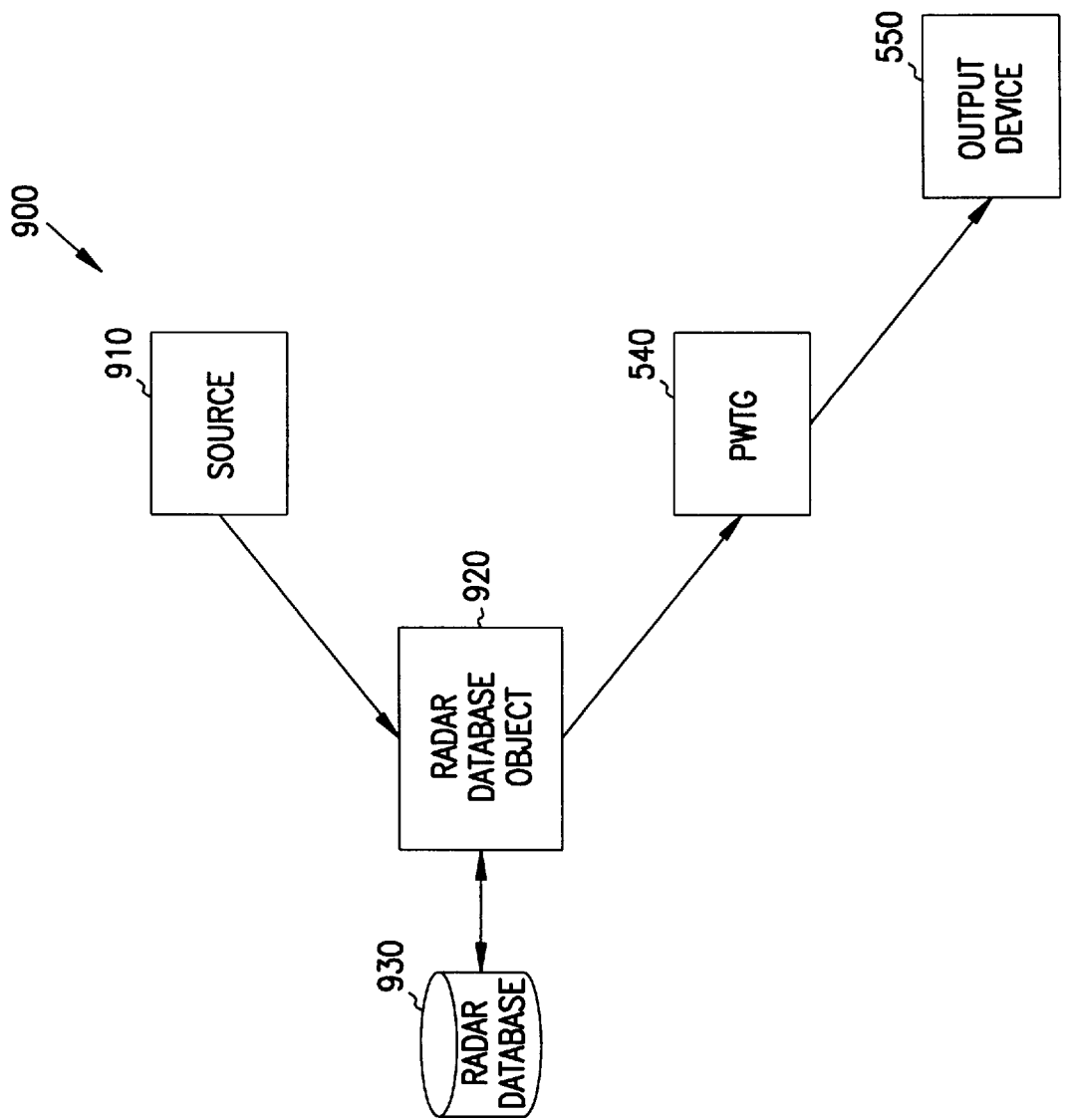
FIG. 9 is a data flow diagram of one embodiment of radar data flow.

Similarly, the radar data ingest 434 reads the radar data records 432 from the source and stores the radar data records 432 in the radar database 436. The radar data ingest 434 uses one or more instantiated radar database objects illustrated as illustrated in FIG. 9 and described in detail below.

Figure 8:
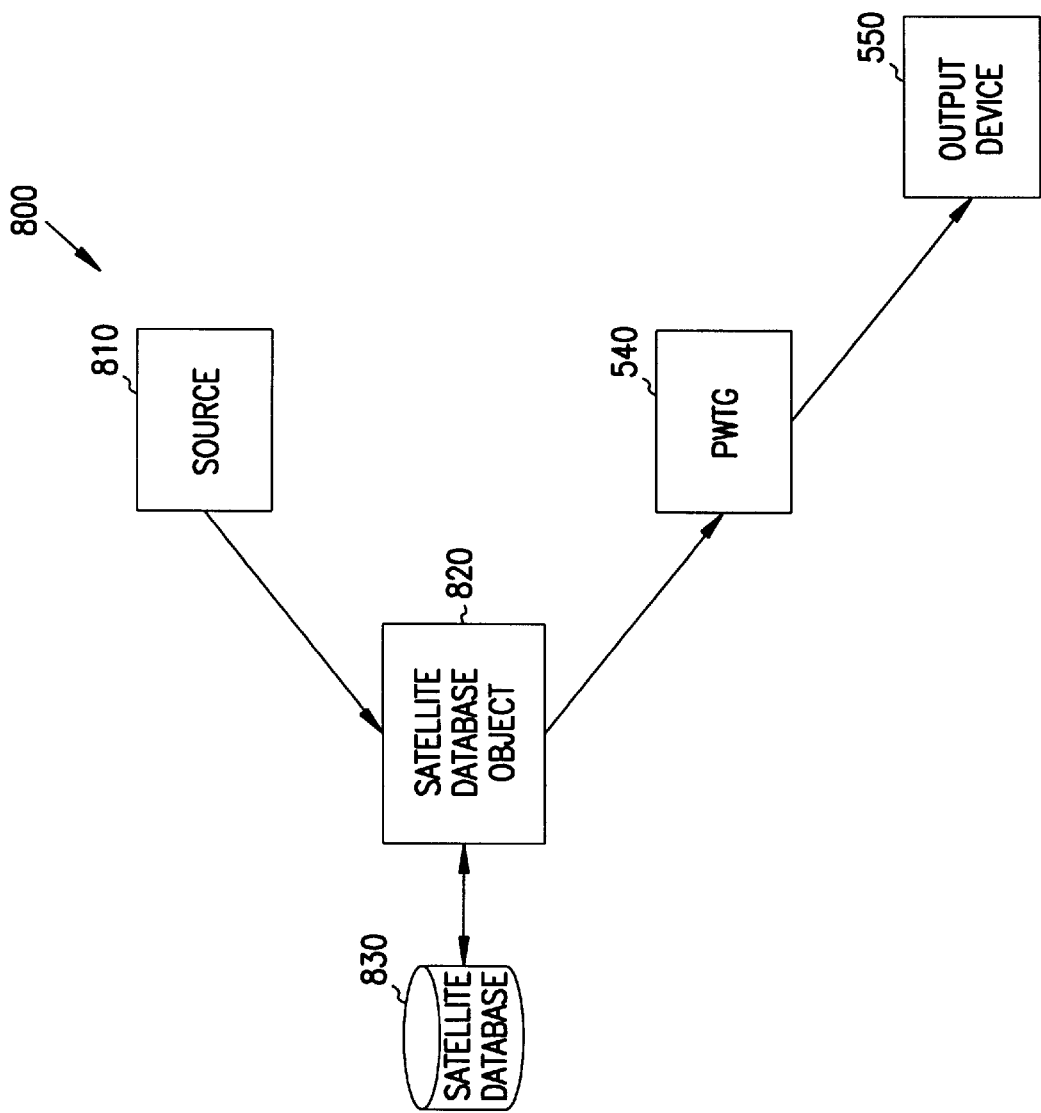
FIG. 8 is a data flow diagram of one embodiment of satellite data flow.

Furthermore, the satellite data ingest 444 reads satellite data records 442 and stores the satellite data records 442 in the satellite database 446. The satellite data ingest 444 uses one or more satellite database objects as illustrated in FIG. 8 and described in detail below.

Figure 7:
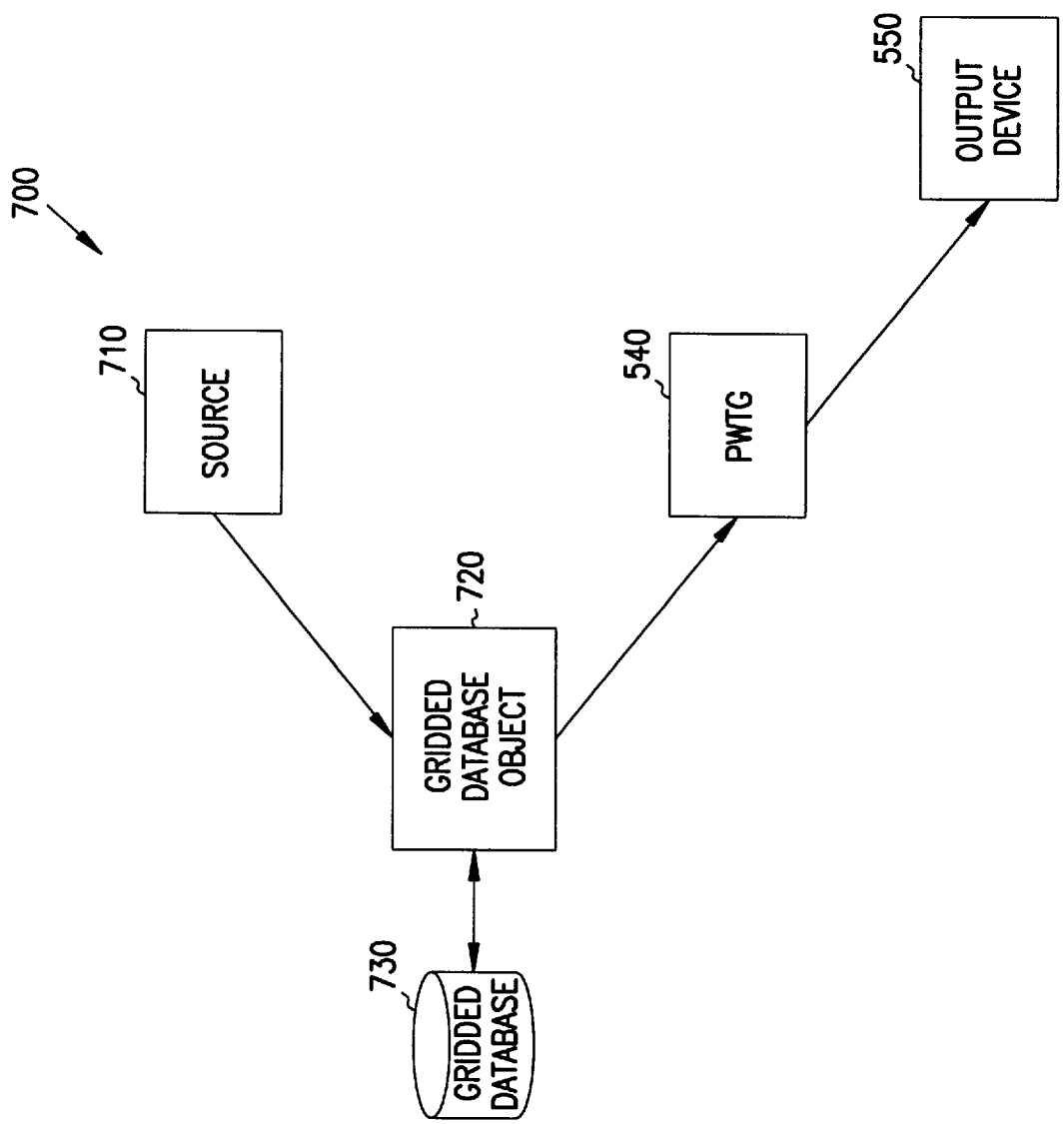
FIG. 7 is a data flow diagram of one embodiment of gridded data flow.

The gridded natural-phenomenological ingest 454 reads gridded natural-phenomenological records 452 and stores the gridded natural-phenomenological records 452 in the gridded natural-phenomenological database 456. The gridded natural-phenomenological ingest 454 uses one or more gridded database objects as illustrated in FIG. 7 and described in detail below.

Figure 6:
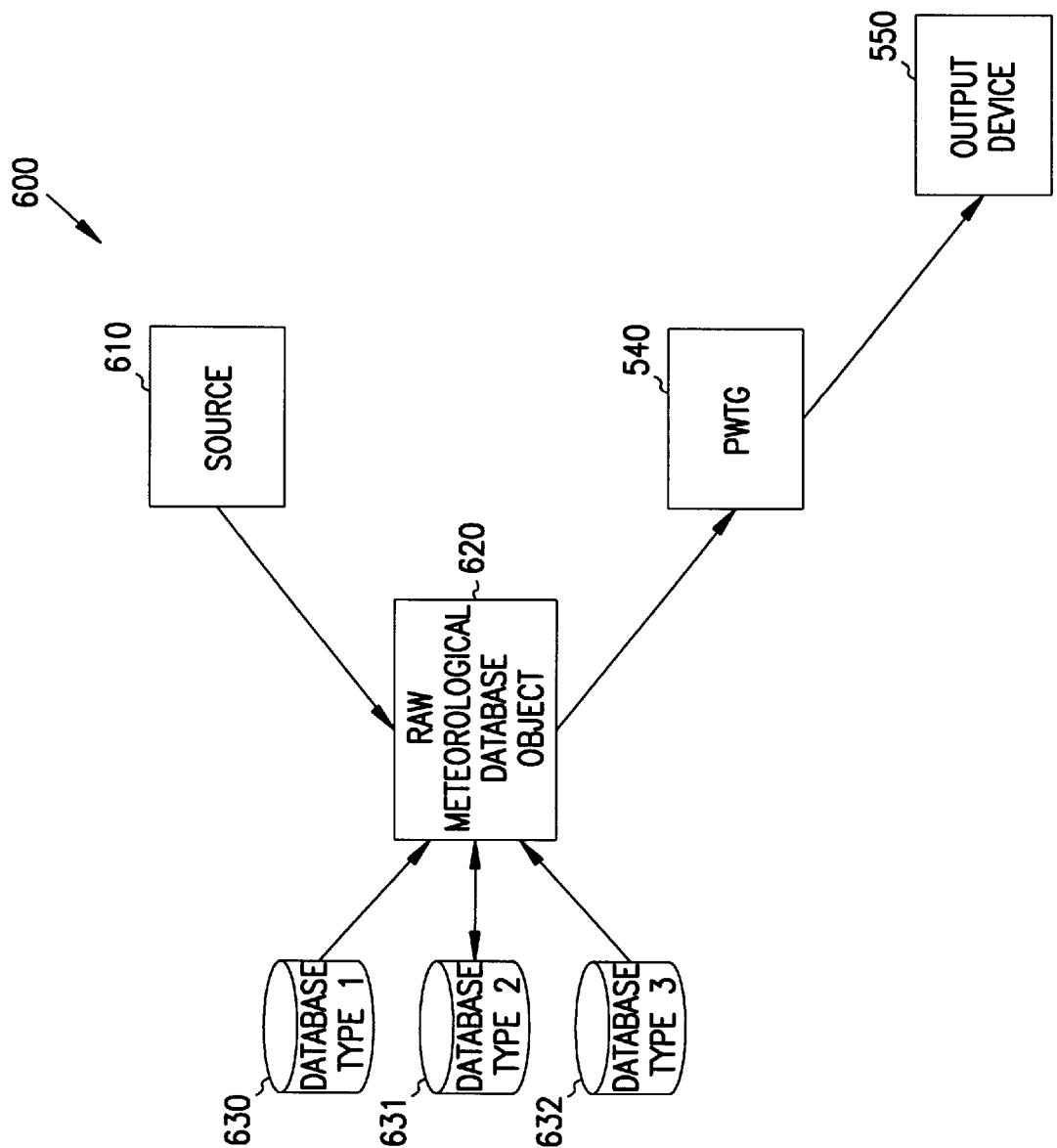
FIG. 6 is a data flow diagram of one embodiment of raw natural-phenomenological data flow.

Finally, the raw natural-phenomenological ingest 464 reads raw natural-phenomenological records 462 and stores the raw natural-phenomenological records 462 in the raw natural-phenomenological database 466. The raw natural-phenomenological ingest 464 uses one or more raw natural-phenomenological database objects as illustrated in FIG. 6 and described in detail below.

All of the above databases are periodically updated with the most recent data. In the present embodiment, the personal preference ingest 424, radar data ingest 434, the satellite data ingest 444 and the gridded natural-phenomenological ingest 454 are implemented on a computer 110 as illustrated in FIG. 1 and described in detail above.

The Personal Weather Text Generator (PWTG) 470 retrieves data from each of the above databases described: The personal preference database 426, the radar database 436, the satellite database 446, gridded natural-phenomenological database 456 and raw natural-phenomenological database 466. The data is analyzed and an output text string 471 of personalized natural-phenomenological information is generated. In one embodiment, the PWTG 470 generates for a subscriber who has indicated in his/her dynamic personal preferences that sailing is an activity of the subscriber, on Jul. 4, 2002 at Miami, Fla., a text string indicating forecast wind conditions on Jul. 4, 2002 at 3 pm in Miami, Fla. is generated, such as "The winds for sailing tomorrow will be 10–12 knots."

Figure 5:
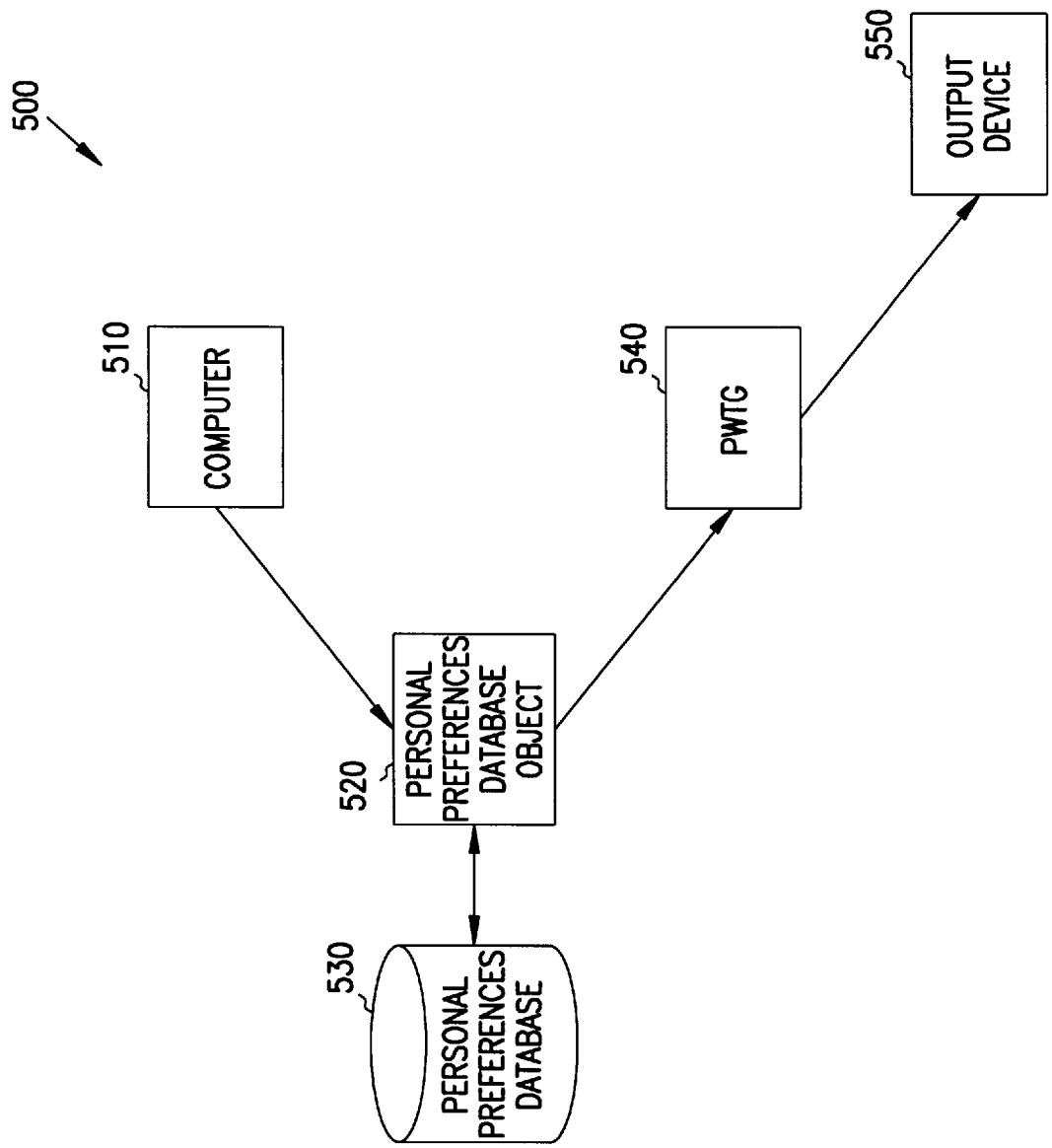
FIG. 5 is a data flow diagram of one embodiment of personal preferences data flow.

The Personal Weather Text Generator (PWTG) 470 can use polymorphism in the retrieval of data from the databases. More specifically, the Personal Weather Text Generator (PWTG) 470 can dynamically bind to the appropriate object in order to retrieve data from the appropriate database. The Personal Weather Text Generator (PWTG) 470 uses one or more personal preference objects as illustrated in FIG. 5 and described below to retrieve data from the personal preference database 426. The Personal Weather Text Generator (PWTG) 470 uses one or more radar database objects as illustrated in FIG. 9 and described in detail below to retrieve data from the radar database 436. The Personal Weather Text Generator (PWTG) 470 uses one or more satellite database objects as illustrated in FIG. 8 and described in detail below to retrieve data from the satellite database 446. The Personal Weather Text Generator (PWTG) 470 uses one or more gridded database objects as illustrated in FIG. 7 and described in detail below to retrieve data from the gridded natural-phenomenological database 456. The Personal Weather Text Generator (PWTG) 470 uses one or more raw natural-phenomenological database objects as illustrated in FIG. 6 and described in detail below to retrieve data from the raw natural-phenomenological database.

Thereafter, the multimedia device interface 480 retrieves the identification of the output devices(s) 481 of the subscriber from the personal preferences database through a personal preferences database object (as shown in FIG. 5), and subsequently encodes the output text string 471 and/or add information appropriate to the device type and in a manner that is compliant to the capabilities, features and functions of the destination device in order to create device-specific personalized multimedia natural-phenomenological information (not shown). In a first embodiment in which the output device is a voicemail output device, the multimedia device interface 480 generates and adds English words to the output text string 471 to create a grammatically correct English sentence which is subsequently converted into a voice-synthesized audio stream compliant to the capabilities, features and functions of the devices that include, telephone, voicemail or a personal digital assistant (PDA). In a second embodiment, the multimedia device interface 480 first generates and adds English words to the output text string 471 to create a grammatically correct English sentence that is compliant to the capabilities, features and functions of pagers, computer display monitors, PDA, or a PCS phone. In yet another embodiment where the output device is a multimedia enabled computer as in FIG.

1 with an HTML-compliant email software browser, where the PWTG 470 generates a text string "The winds for sailing tomorrow will be 10–12 knots," the multimedia device interface 480 subsequently generates HTML statements with the text string embedded, which is in turn embedded in an HTTP-compliant email message. The text string can also be converted to a voice-synthesized audio stream and embedded in the HTTP-compliant email message, and an animated graphic file of a television meteorologist is generated and embedded in the email message.

Finally, the multimedia device interface 480 transmits the personalized multimedia natural-phenomenological information to devices 490, 491, and 492. Devices 490, 491, and 492 include, telephones, voicemail systems, pagers, multimedia-enabled computers, email, computer display monitors, PDAs, or PCS phones. To continue with the above example of an email message with forecast winds for Miami on Jul. 4, 2002, when the subscriber receives the email message, the animated graphic of the meteorologist executes on the subscriber's multimedia-enabled computer in synchronization with the audio stream and announce the natural-phenomenological forecast for winds in Miami on Jul. 4, 2002.

Turning now to FIG. 5, the data flow diagram illustrates a personal preferences implementation 500 of the method described in conjunction with FIG. 3. The Personal Preferences Database Object 520 is instantiated and executes on a server computer 110 apparatus as disclosed in FIG. 1. In other embodiments, multiple instances of Personal Preferences Database Objects 520 execute on one or more computers in a networked environment. The data flow originates with the computer 510 such as computer 110 in FIG. 1 that the subscriber uses to enter the personal preference data into electronic format. In other embodiments not shown, the data flow begins with the subscriber recording the personal preference data on a paper form that is manually or mechanically entered into electronic format. The personal preferences data includes static and dynamic data; the static data includes, identification of the subscriber and a password; dynamic information includes activity, calendar, geographic location and sensitivity data. The electronically formatted personal preference data is transmitted through the Internet to the Personal Preferences Database Object 520, which in turn stores the personal preferences data in the Personal Preferences Database 530. Subsequently, the Personal Weather Text Generator 540 uses one or more methods of the Personal Preferences Database Object 520 to retrieve the personal preferences data from the Personal Preferences Database 530. Finally, Personal Weather Text Generator 540 uses the personal preference data along with meteorological data to generate a personal natural-phenomenological text string, which is later encoded according to the capabilities, features and functions of the Output Device 550, and transmitted to the Output Device 550.

Turning now to FIG. 6, the data flow diagram illustrates a meteorological preferences implementation 600 of the method described in conjunction with FIG. 3. The Raw Meteorological Database Object 620 is instantiated and executes on a server computer apparatus 110 as disclosed in FIG. 1. In other embodiments, multiple instances of Raw Meteorological Database Objects 620 execute on one or more computers in a networked environment. The data flow originates with the source 610 in an electronic format. The source includes any one of a number of conventional data sources, a database, and measuring equipment. The electronically formatted raw meteorological data is communicated to the Raw Meteorological Database Object 620, through any one of a number of conventional communication paths, such as, a direct dial-up connection, a wireless connection, a LAN connection, a WAN connection, the Internet, or a physical mass storage medium such as tape cartridge, Bernoulli cartridge or optical disk. The Raw Meteorological Database Object 620 in turn stores the raw meteorological data in one of the raw meteorological Database Type 1 630, Database Type 2 631, or Database Type 3 632, according to the type of raw meteorological data that is being processed. The types of raw meteorological data include ground observational meteorological data, severe weather warnings and forecast data. Subsequently, the Personal Weather Text Generator 540 uses one or more methods of the Raw Meteorological Database Object 620 to retrieve the raw meteorological data from the Raw Meteorological database 630, 631, and 632. Finally, the Personal Weather Text Generator 540 uses the raw meteorological data along with personal preference data to generate a personal natural-phenomenological text string, which is later encoded according to the capabilities, features and functions of the Output Device 550, and transmitted to the Output Device 550.

Turning now to FIG. 7, the data flow diagram illustrates a gridded data implementation 700 of the method described in conjunction with FIG. 3. The Gridded Database Object 720 is instantiated and executes on a server computer apparatus 110 as disclosed in FIG. 1. In other embodiments, multiple instances of Gridded Database Objects 720 execute on one or more computers in a networked environment. The data flow originates with the source 710. The source includes any one of a number of conventional data sources, databases, and measuring equipment. The electronically formatted gridded data is transmitted to the Gridded Database Object 720 through any one of a number of conventional communication paths, such as, a direct dial-up connection, a wireless connection, a LAN connection, a WAN connection, the Internet, or a physical mass storage medium such as tape cartridge, Bernoulli cartridge or optical disk. The Gridded Database Object 720 in turn stores the gridded data in the Gridded Database 730. Subsequently, the Personal Weather Text Generator 540 uses one or more methods of the Gridded Database Object 720 to retrieve the gridded data from the Gridded database 730. Finally, the Personal Weather Text Generator 540 uses the gridded data along with personal preference data to generate a personal natural-phenomenological text string, which is later encoded according to the capabilities, features and functions of the Output Device 550, and transmitted to the Output Device 550.

Turning now to FIG. 8, the data flow diagram illustrates a satellite data implementation 800 of the method described in conjunction with FIG. 3. The Satellite Database Object 820 is instantiated and executes on a server computer apparatus 110 as disclosed in FIG. 1. In other embodiments, multiple instances of Satellite Database Objects 820 execute on one or more computers in a networked environment. The data flow originates with the source 810. The source includes any one of a number of conventional data sources, a database, and satellite equipment. The electronically formatted satellite data is transmitted to the Satellite Database Object 820 through any one of a number of conventional communication paths, such as, a direct dial-up connection, a wireless connection, a LAN connection, a WAN connection, the Internet, or a physical mass storage medium such as tape cartridge, Bernoulli cartridge or optical disk. The Satellite Database Object 820 in turn stores the satellite data in the Satellite Database 830. Subsequently, the Personal Weather Text Generator 540 uses one or more methods of the Satellite Database Object 820 to retrieve the satellite data from the Satellite database 830. Finally, the Personal Weather Text Generator 540 uses the satellite data along with personal preference data to generate a personal natural-phenomenological text string, which is later encoded according to the capabilities, features and functions of the Output Device 550, and transmitted to the Output Device 550.

Turning now to FIG. 9, the data flow diagram illustrates a radar data implementation 900 of the method described in conjunction with FIG. 3. The Radar Database Object 920 is instantiated and execute on a server computer apparatus 110 as disclosed in FIG. 1. In other embodiments, multiple instances of Radar Database Objects 920 execute on one or more computers in a networked environment. The data flow originates with the source 910. The source includes any one of a number of conventional data sources, a database, and measuring equipment. The electronically formatted radar data is transmitted to the Radar Database Object 920 through any one of a number of conventional communication paths, such as, a direct dial-up connection, a wireless connection, a LAN connection, a WAN connection, the Internet, or a physical mass storage medium such as tape cartridge, Bernoulli cartridge or optical disk. The Radar Database Object 920 in turn stores the radar data in the Radar Database 930. Subsequently, the Personal Weather Text Generator 540 uses one or more methods of the Radar Database Object 920 to retrieve the radar data from the Radar database 930. Finally, the Personal Weather Text Generator 540 uses the radar data along with personal preference data to generate a personal natural-phenomenological text string, which is later encoded according to the capabilities, features and functions of the Output Device 550, and transmitted to the Output Device 550.

FIGS. 10–17 disclose exemplary embodiments of software classes to implement the method described in conjunction with FIG. 3. The figures use the Unified Modeling Language (UML), which is the industry-standard language for specifying, visualizing, constructing, and documenting the object-oriented artifacts of software systems. In the figures, a hollow arrow between classes is used to indicate that a child class below a parent class inherits attributes and methods from the parent class. In addition, a solid-filled diamond is used to indicate that an object of the class that is depicted above an object of another classes is composed of the lower depicted object. Composition defines the attributes of an instance of a class as containing an instance of one or more existing instances of other classes in which the composing object does not inherit from the object(s) it is composed of.

Figure 10:
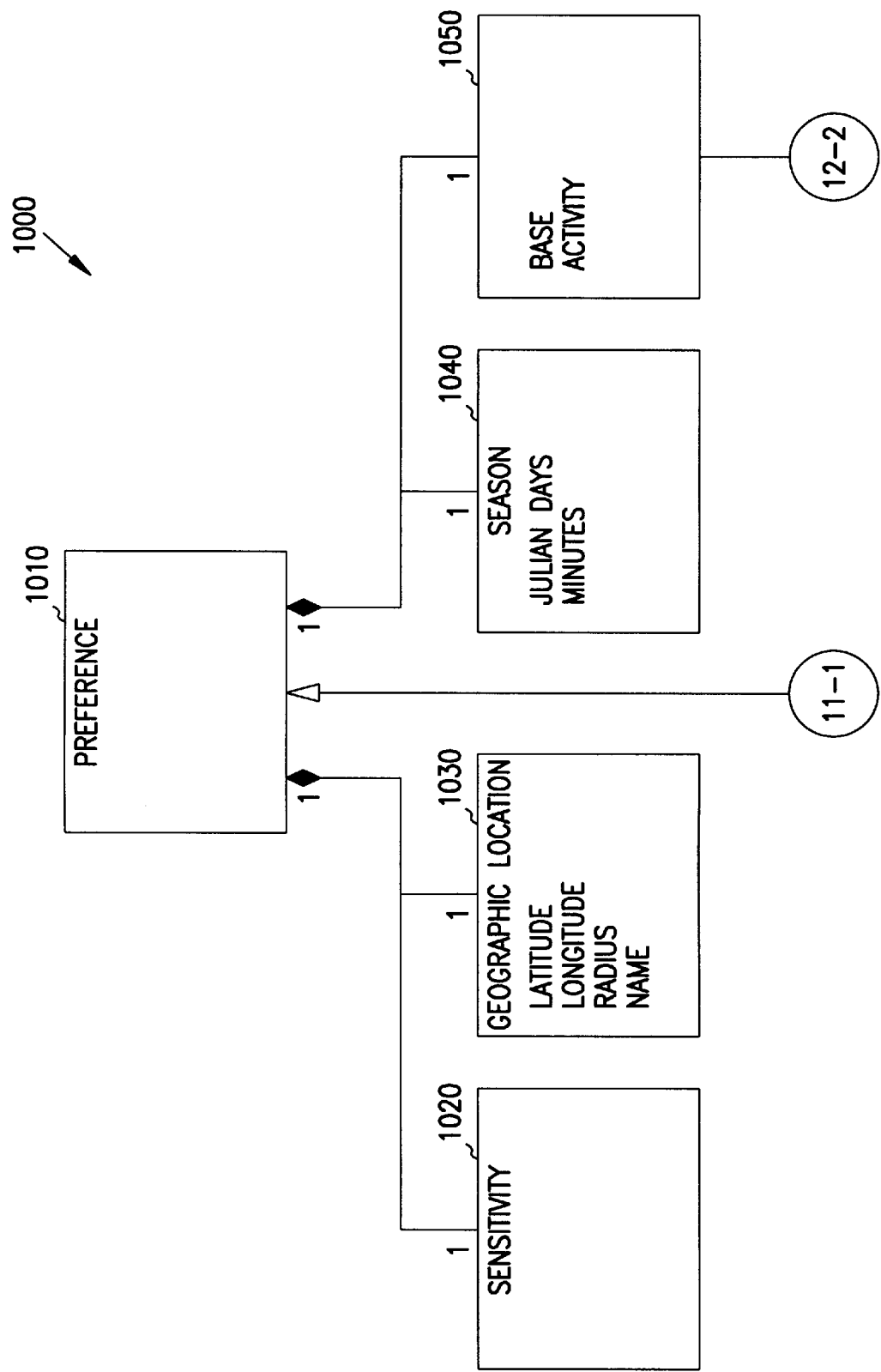
FIG. 10 is a class diagram of one embodiment of the personal-preferences class and classes related to the personal-preferences class.

FIG. 10 is a class diagram of one embodiment of the personal-preferences class and classes related to the personal-preferences class of the apparatus described in conjunction with FIG. 5. The axiomatic parent class for personal-preferences classes is the preference class 1010. The preference class 1010 is composed of one object instantiated from the sensitivity class 1020 identified as the "sensitivity" object, one object instantiated from the geographic-location class 1030 identified as the "geo" class, one object instantiated from the season class 1040 identified as the "season" object, and one object instantiated from the base-activity class, 1210 in FIG. 12, identified as the "activity" object. The attributes of the geographic-location 1030 class describe the longitude and latitude of the geographic-location and the radius of the area of interest extending from the longitude and latitude. The attributes of the season 1040 class describe the Julian days and the minute of the season. The composition of the preference class 1010 indicates that the objects of the class's sensitivity 1020, geographic-location 1030, season 1040, and base-activity 1050 are instantiated only during the instantiation of an object of the preference class 1010 or any of it child classes.

Figure 11:
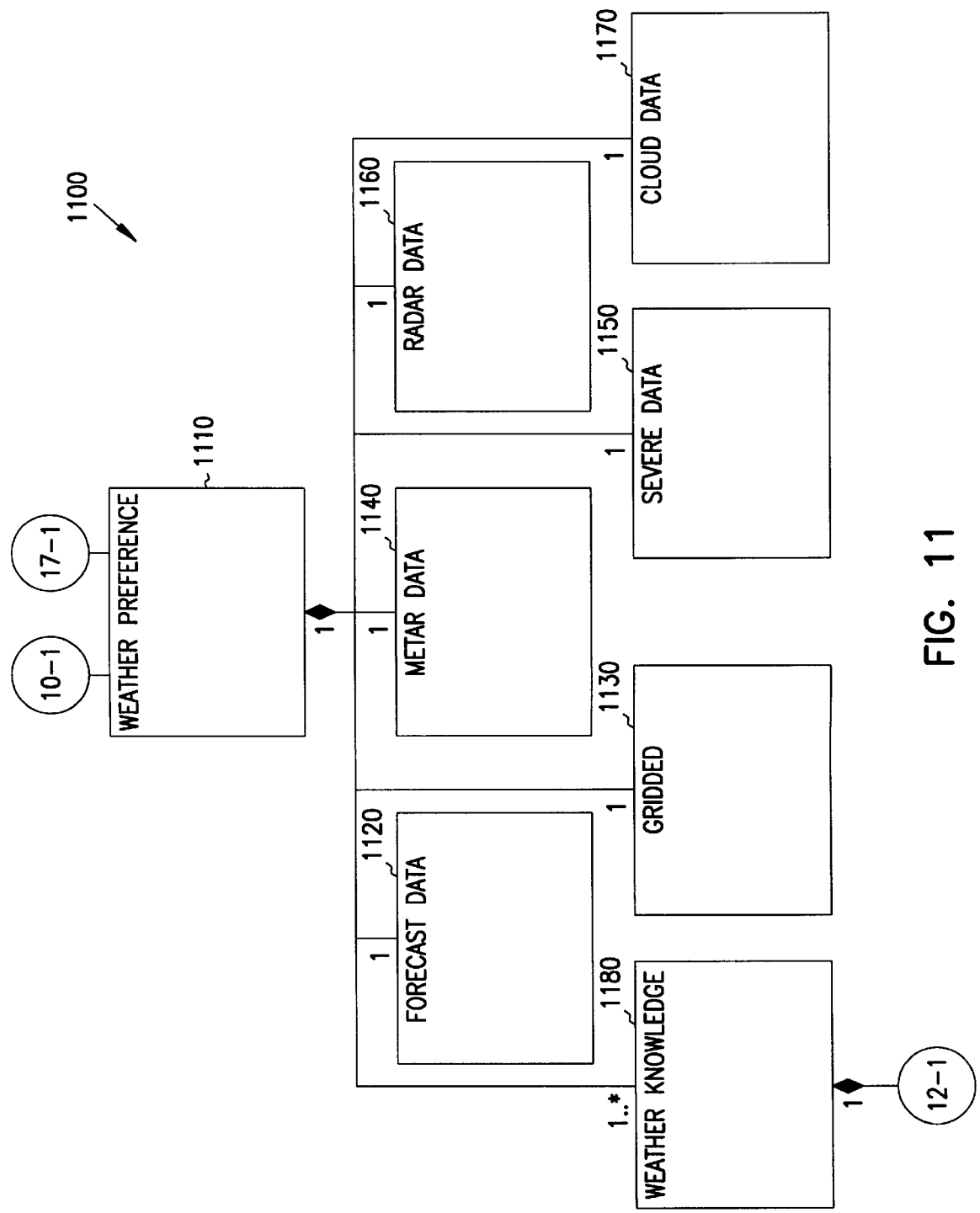
FIG. 11 is a class diagram of one embodiment of the weather-preferences class and classes related to the weather-preferences class.

FIG. 11 is a class diagram of one embodiment of the weather-preferences class and classes related to the weather-preferences class. The weather-preference class 1110 is a child class that inherits attributes and methods from the preference class 1010 of FIG. 10. The weather-preference class 1110 is composed of one object instantiated from the forecast-data class 1120 identified as the "forecast" object, one object instantiated from the gridded-data class 1130 identified as the "grid-data" object, one object instantiated from the metar-data lass 1140 identified as the "metar-data" object, one object instantiated from the severe-weather-data class 1150 identified as the "severe-data" object, one object instantiated from the radar-data class 1160 identified as the "radar-data" object, one object instantiated from the cloud-data class 1170 identified as the "cloud-data" object, and at least one object from the weather-knowledge class 1180 statically identified as the "weather-knowledge" object. The composition of the weather-preference class 1110 indicates that objects "forecast," "grid-data," "metar-data," "severe-data," "radar-data," "cloud-data," and "weather-knowledge" are instantiated only during the instantiation of an object of the weather-preference class 1110. Therefore, the objects that the weather-preference class 1110 is composed of is not instantiated before or after the instantiation of a weather-preference class 1110 object as in object aggregation.

Figure 12:
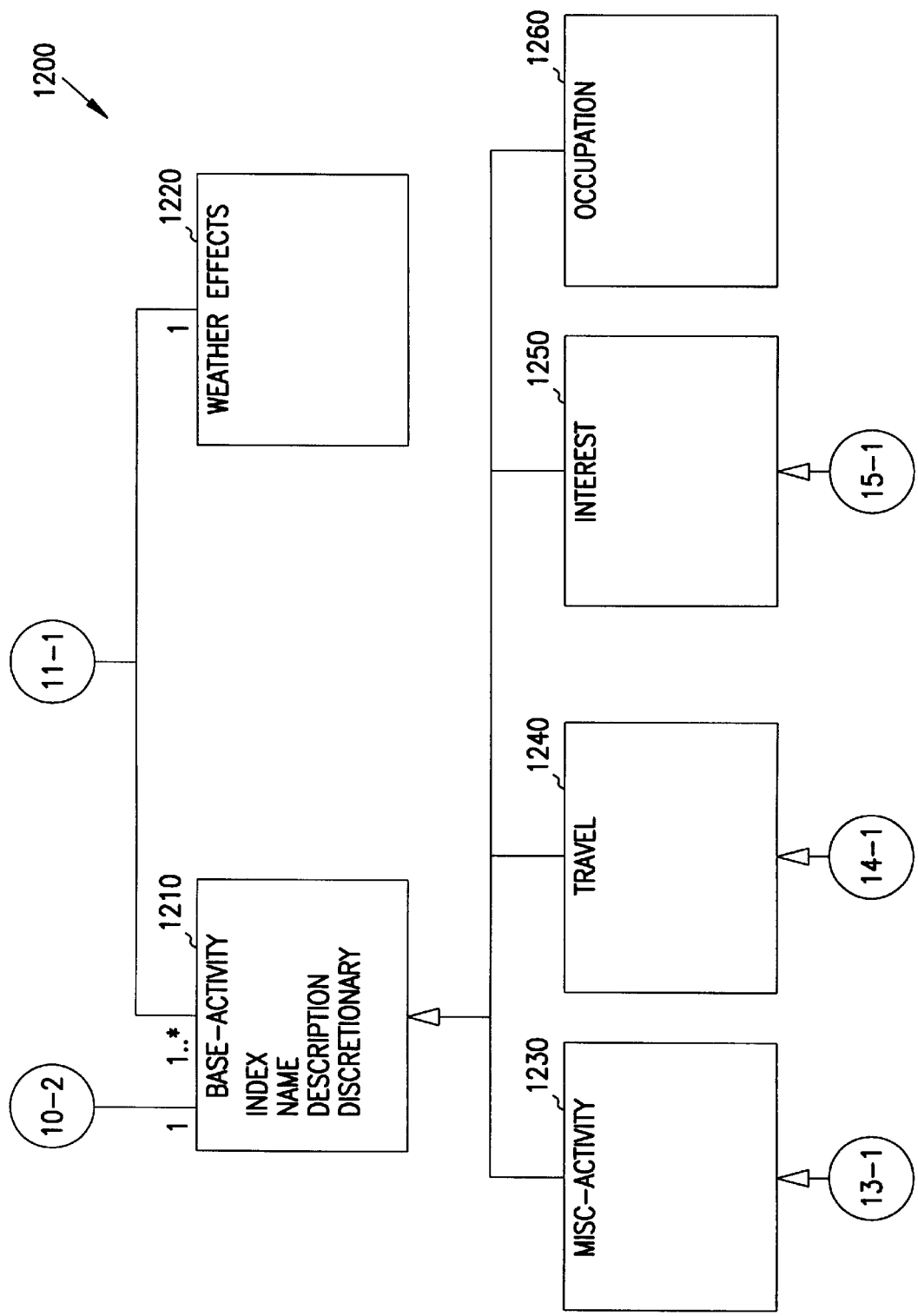
FIG. 12 is a class diagram of one embodiment of the weather-knowledge class and classes related to the weather-knowledge class.

FIG. 12 is a class diagram of one embodiment of the weather-knowledge class and classes related to the weather-knowledge class. The preference class 1010 in FIG. 10 is composed of one object instantiated from the base-activity class 1210 identified as the "activity" object. Moreover, the weather-knowledge class 1180 in FIG. 11 is composed of at least one object instantiated from the base-activity class 1210 identified as the "activity" object, and one object instantiated from the weather-effects class 1220 identified as the "effects" class. The attributes of the base-activity class 1210 describe the index, the name, the description and the discretionary data of the base-activity class 1210. The composition of the weather-knowledge 1180 in FIG. 11 indicates that the objects of the classes base-activity class 1210 and one object of the weather-effects class 1220 are instantiated only during the instantiation of an object of the weather-knowledge class 1180 in FIG. 11. The base-activity class 1210 has three child classes, miscellaneous-activity class 1230, the travel class 1240, the interest class 1250, and the occupation class 1260, each of which inherit attributes and methods from the base-activity class 1210. The child classes of the miscellaneous-activity class 1230, the travel class 1240, and the interest class 1250 are depicted in FIGS. 13, 14 and 15, respectively, and described in detail below.

Figure 13:
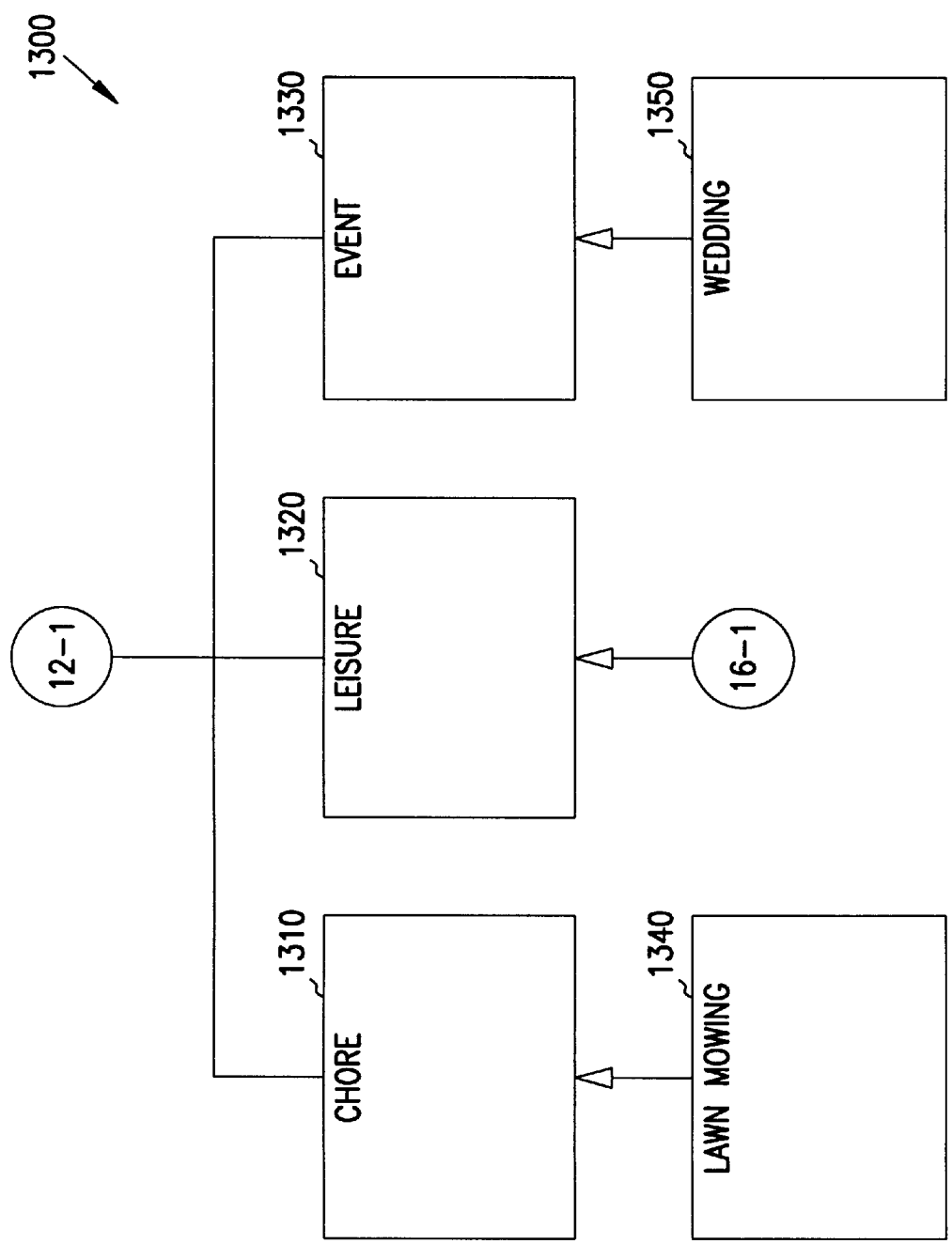
FIG. 13 is a class diagram of one embodiment of the miscellaneous-activity class and classes related to the miscellaneous-activity class.

FIG. 13 is a class diagram of one embodiment of the miscellaneous-activity class and classes related to the miscellaneous-activity class 1230 in FIG. 12. The miscellaneous-activity class 1230 in FIG. 12 is specialized by three child classes, the chore class 1310, the leisure class 1320, and the event class 1330, all of which inherit attributes and methods from the miscellaneous-activity class 1230 in FIG. 12. The chore class 1310 has a child class, the lawn-mowing class 1340 that inherits attributes and methods from the chore class 1310. The event class 1330 has a child class, the wedding class 1350 that inherits attributes and methods from the event class 1330. The child classes of the leisure class 1320 are depicted in FIG. 16 and described in detail below.

Figure 14:
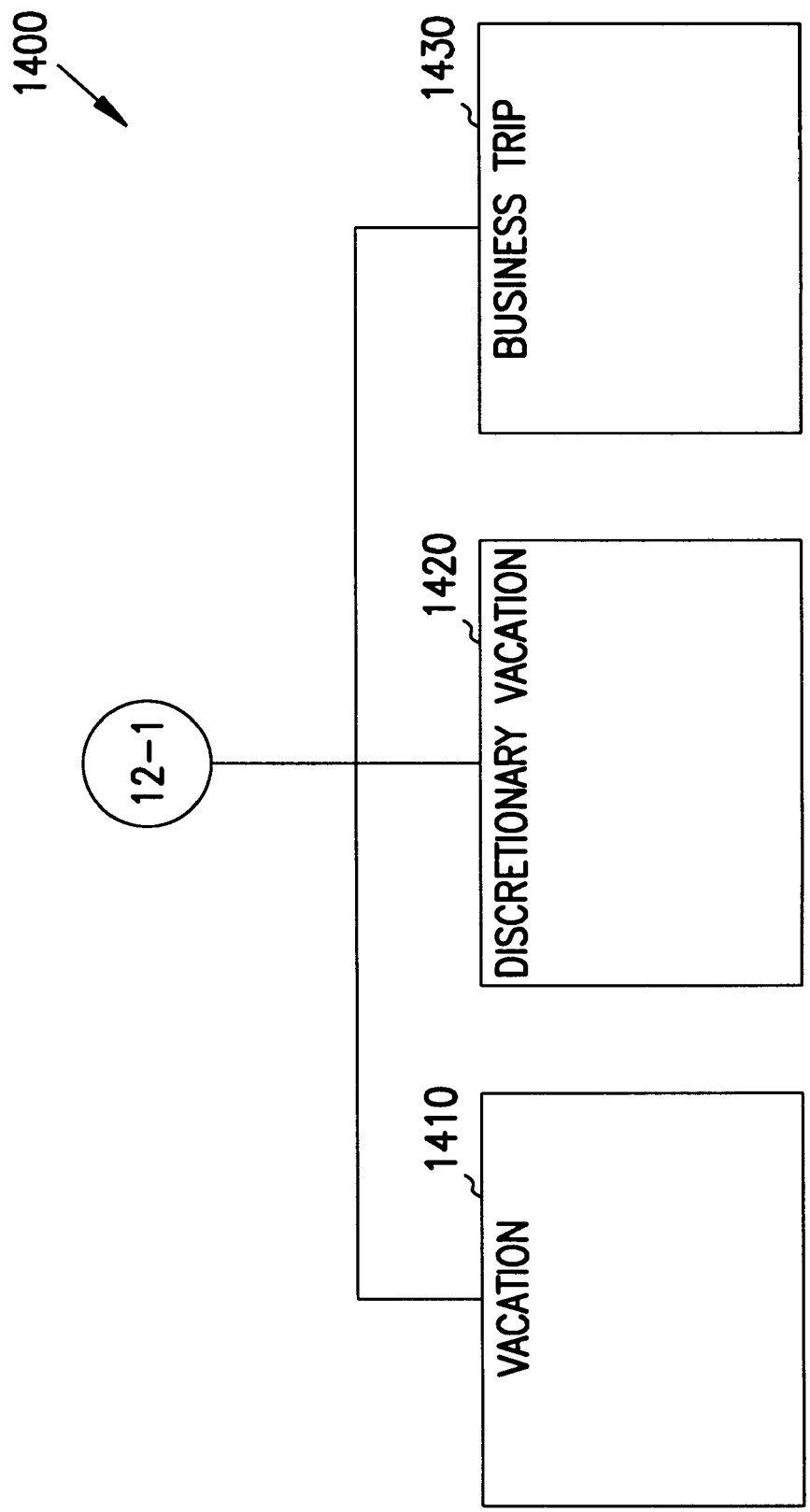
FIG. 14 is a class diagram of one embodiment of the travel class and classes related to the travel class.

FIG. 14 is a class diagram of one embodiment of the child classes of the travel class 1240 in FIG. 12. The travel class 1240 in FIG. 12 is specialized by the child classes vacation class 1410, discretionary-vacation class 1420, and business-trip class 1430. These child classes inherit attributes and methods from the travel class 1240 in FIG. 12.

Figure 15:
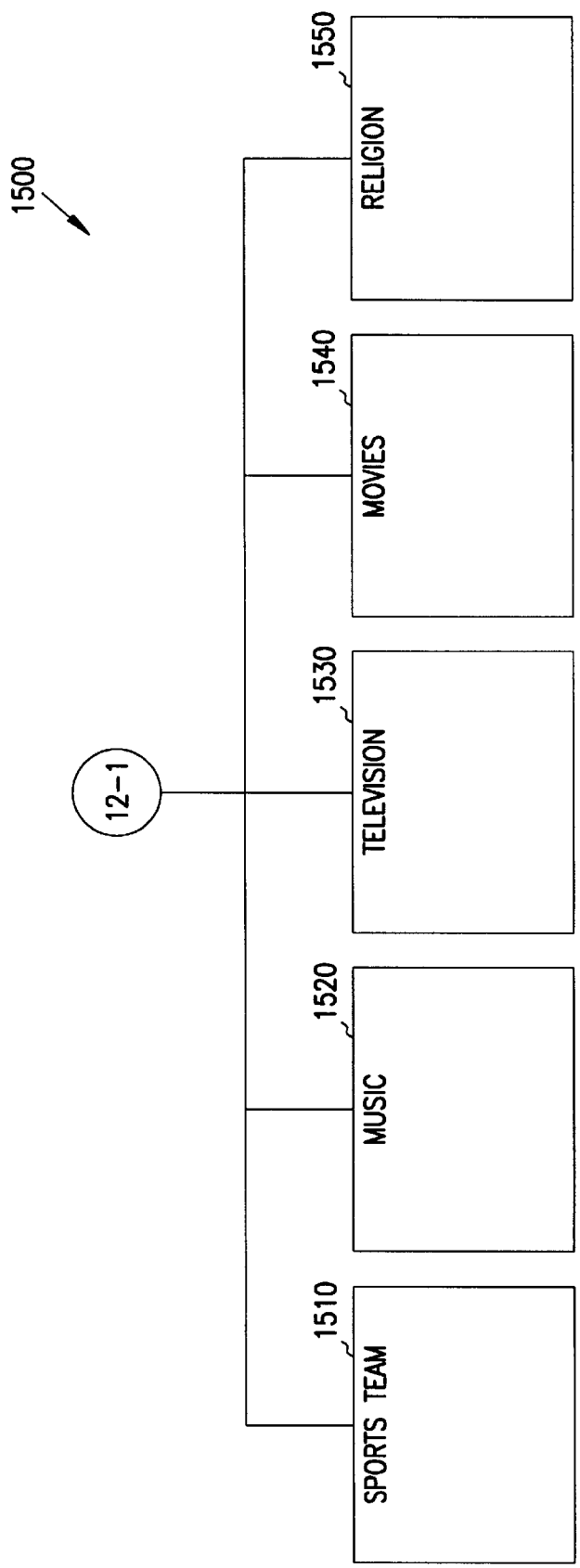
FIG. 15 is a class diagram of one embodiment of the interest class and classes related to the interest class.

FIG. 15 is a class diagram of one embodiment of the interest class 1250 in FIG. 12. The interest class 1250 in FIG. 12 is specialized by child classes sports-team class 1510, music class 1520, television class 1530, movies class 1540, and religion class 1550. These child classes inherit attributes and methods from their parent class, the interest class 1250 in FIG. 12

Figure 16:
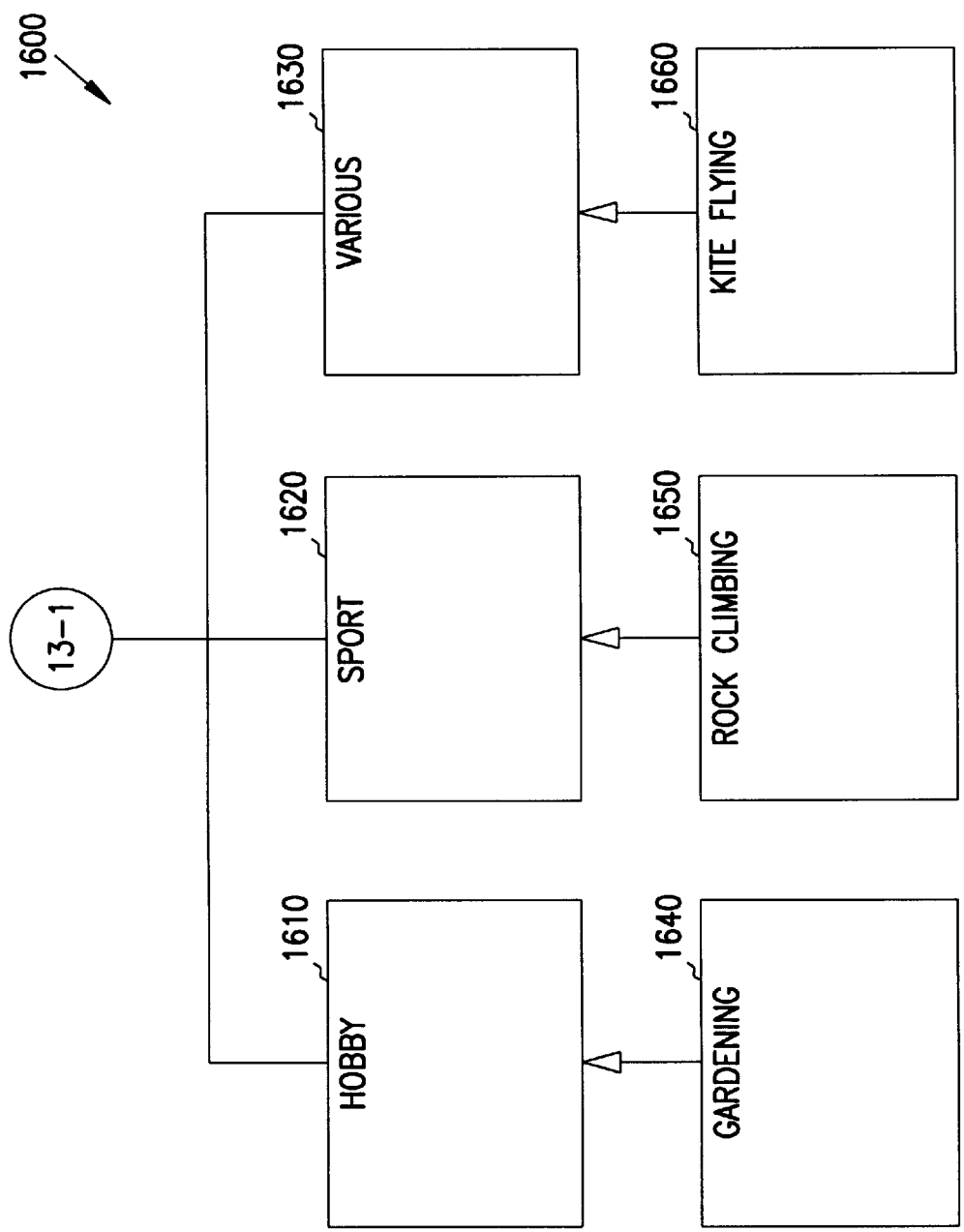
FIG. 16 is a class diagram of one embodiment of the leisure class and classes related to the leisure class.

FIG. 16 is a class diagram of one embodiment of the leisure class 1320 in FIG. 13. The leisure class 1320 in FIG. 13 is specialized by three child classes, the hobby class 1610, the sport class 1620, and the various class 1630, that inherits attributes and methods from the leisure class 1320 in FIG. 13. The hobby class 1610 is specialized by the gardening class 1640, the sport class 1620 is specialized by the rock climbing class 1650 and the various class 1630 is specialized by the kite-flying class 1660. The gardening class 1640 inherits attributes and methods from the hobby class 1610. The rock climbing class 1650 inherits attributes and methods from the sport class 1620. The kite-flying class 1660 inherits attributes and methods from the various class 1630.

Figure 17:
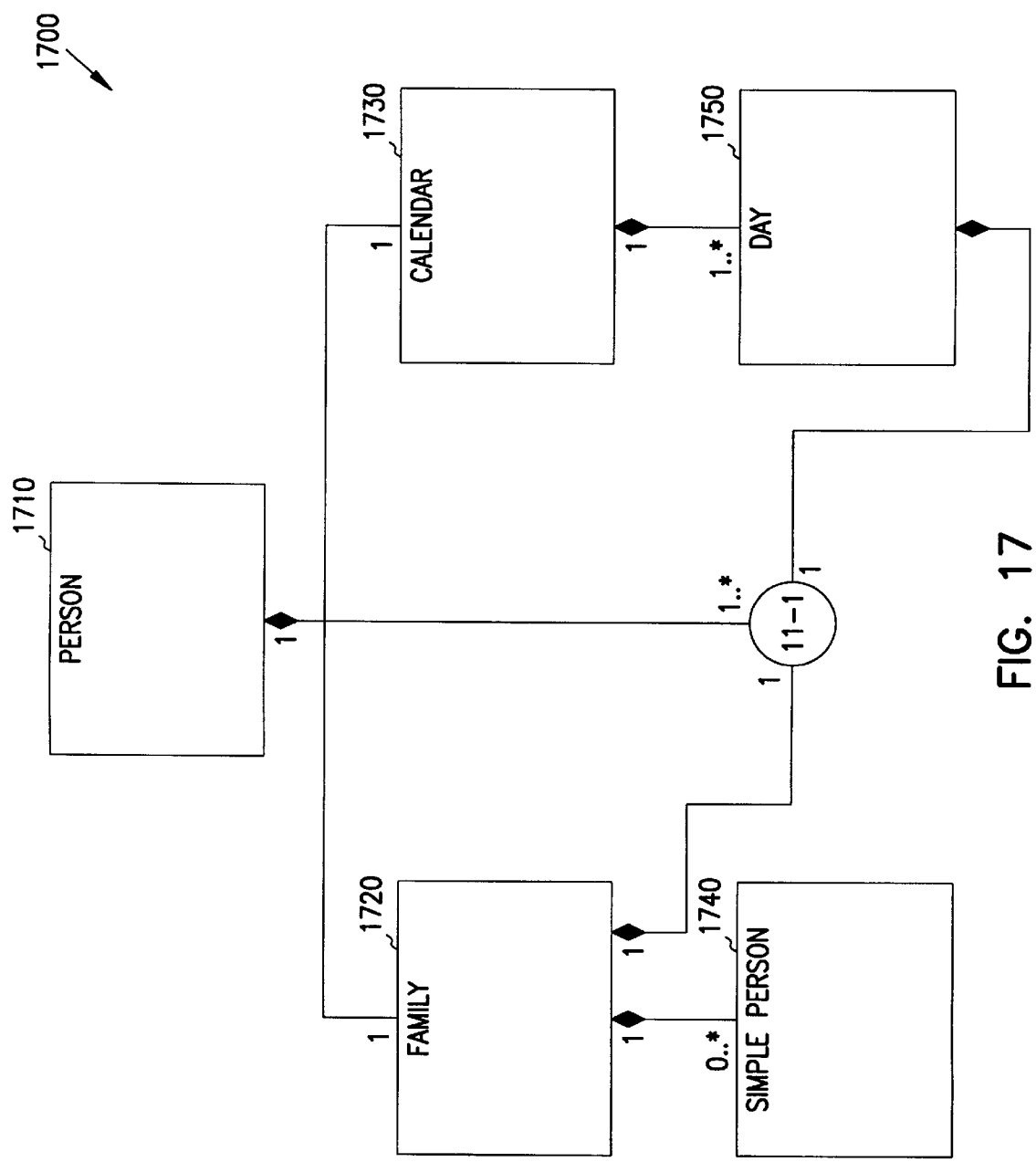
FIG. 17 is a class diagram of one embodiment of the person class and classes related to the person class.

FIG. 17 is a class diagram of one embodiment of the person class and classes related to the person class. Objects instantiated from the person class 1710 are composed of one instantiated object of the family class 1720, one instantiated object of the calendar class 1730 and at least one instantiated object of the weather-preference class 1110 of FIG. 11. Instantiated objects of the family class 1720 are composed of one object of the simple-person class 1740 identified as a "spouse" object, and zero or more objects of the simple-person class 1740 identified as "children" objects. Furthermore, each instantiated object of the family class 1720 is composed of one object of the weather-preference class 1110 of FIG. 11 identified as a family-activity object. Instantiated objects of the calendar class 1730 are composed of one or more objects of the day class 1750 named "days", and each instantiated object of the day class 1750 is composed of one objects of the weather-preference class 1110 of FIG. 11 identified as a "event" object.

Conclusion

The invention personalizes natural-phenomenological information to the requirements of the consumer of the natural-phenomenological information. The invention personalizes the natural-phenomenological information based on a variety of criteria which includes the consumer's activities, locations of the activities, schedule of the activities, and sensitivities of the subscriber. In one embodiment, the invention retrieves the natural-phenomenological information from a variety of sources including METAR data, GRIB data, satellite data, and radar data. In another embodiment, the invention distributes the personalized natural-phenomenological information to a variety of destination output devices including pagers, text to voice synthesizers to create an audio stream for playback either via a telephone or a personal digital assistant (PDA), a multimedia-enabled computer, email, computer display monitors, PDA, and a PCS phone. In yet another embodiment, the invention is extensible to support new sources of natural-phenomenological information and new output devices.

A personalized natural-phenomenological multimedia generator and distributor has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although described in object-oriented terms, one of ordinary skill in the art will appreciate that the invention can be implemented in a procedural design environment or any other design environment that provides the required relationships.

In particular, one of skill in the art will readily appreciate that the names of the methods and properties are not intended to limit the invention. Furthermore, additional methods and properties can be added to the objects, functions can be rearranged among the objects, and new objects to correspond to future enhancements and physical devices used in the invention can be introduced without departing from the scope of the invention. One of skill in the art will readily recognize that the invention can be applicable to future communication devices, different file systems, and new data types.

The terminology used in this application with respect to is meant to include all object-oriented environments and alternate technologies which provide the same functionality as described herein. Therefore, it is manifestly intended that this invention be limited only by the following claims and equivalents thereof.

What is claimed is:

1. A method for generating and distributing personalized natural-phenomenological information comprising:

receiving natural-phenomenological data from a source;

receiving predetermined criteria for selecting natural-phenomenological data, wherein the predetermined criteria comprises information that describes at least one activity;

selecting a portion of the natural-phenomenological data based on the predetermined criteria; and transmitting the portion to at least one destination device.

2. The method of claim 1, wherein receiving natural-phenomenological data occurs before receiving predetermined criteria for selecting natural-phenomenological data.

3. The method of claim 1, further comprising before transmitting, receiving predetermined criteria identifying at least one destination device; and wherein transmitting further comprises encoding the portion compliant to the destination device medium capabilities, features and functions.

4. The method of claim 1, wherein the predetermined criteria further comprises:

at least one sensitivity to natural phenomena;

a schedule of the at least one activity; and at least one geographic location of the at least one activity.

5. The method of claim 1, wherein the portion is text data.

6. The method of claim 1, wherein the destination device includes one or more devices selected from the group consisting of a telephone, a voicemail system, a pager, a multimedia-enabled computer, an email system, a computer display monitor, a personal digital assistant, and a personal communication system phone.

7. A computer-readable medium having computer-executable instructions to cause a server computer to perform a method comprising:

receiving natural-phenomenological data from a source;

receiving predetermined criteria for selecting natural-phenomenological data, wherein the predetermined criteria comprises information that describes at least one activity;

selecting a portion of the natural-phenomenological data based on the predetermined criteria; and transmitting the portion to at least one destination device.

8. The method of claim 7, wherein receiving natural-phenomenological data occurs before receiving predetermined criteria for selecting natural-phenomenological data.

9. The computer-readable medium of claim 7, further comprising before transmitting, receiving predetermined criteria identifying at least one destination device; and wherein transmitting further comprises encoding the portion compliant to the destination device medium and capabilities.

10. The computer-readable medium of claim 7, wherein the predetermined criteria further comprises:

at least sensitivity to natural phenomena;

a schedule of activities; and at least one geographic location associated with each of the at least one activity.

11. The computer-readable medium of claim 7, wherein the portion is text data.

12. The computer-readable medium of claim 7, wherein the destination device includes one or more devices selected from the group consisting of a telephone, a voicemail system, a pager, a multimedia-enabled computer, an email system, a computer display monitor, a personal digital assistant, and a personal communication system phone.

13. A computerized system for generating and distributing personalized natural-phenomenological information, comprising:

a receiver of natural-phenomenological data;

a receiver of predetermined criteria for selection of natural-phenomenological data, wherein the predetermined criteria comprises information that describes at least one activity;

a selector of a portion of the natural-phenomenological data based on the predetermined criteria, communicatively connected to the receiver of natural-phenomenological data and the receiver of predetermined criteria; and at least one transmitter communicatively connected between the selector and at least one destination device.

14. The computerized system of claim 13, further comprising a receiver of predetermined criteria of at least one destination device, communicatively coupled between the selector and the transmitter; and wherein the transmitter encodes the portion compliant to the capabilities, features and functions of the destination device medium and transmits the encoded portion to the destination device.

15. The computerized system of claim 13, wherein the predetermined criteria further comprises at least one sensitivity to natural phenomena, a schedule of the at least one activity, and at least one geographic location of each of the at least one activity.

16. The computerized system of claim 13, wherein the portion is text data.

17. The computerized system of claim 13, wherein the destination device includes one or more devices selected from the group consisting of a telephone, a voicemail system, a pager, a multimedia-enabled computer, an email system, a computer display monitor, a personal digital assistant, and a personal communication system phone.

18. A computer data signal embodied in a carrier wave comprising computer data including personalized natural-phenomenological information, wherein the computer data is generated by a method comprising of:

receiving natural-phenomenological data from a source;

receiving predetermined criteria for selecting natural-phenomenological data, wherein the predetermined criteria comprises information that describes at least one activity; and selecting a portion of the natural-phenomenological data based on the predetermined criteria.

19. The computer data signal of claim 18, wherein receiving natural-phenomenological data occurs before receiving predetermined criteria for selecting natural-phenomenological data.

20. The computer data signal of claim 18, wherein the portion is encoded in a manner compliant to a destination device medium capabilities, features and functions.

21. The computer data signal of claim 20, wherein the destination device is at least one of a telephone, a voicemail system, a pager, a multimedia-enabled computer, email system, a computer display monitor, a personal digital assistant, and a personal communication system phone.

22. The computer data signal of claim 18, wherein the predetermined criteria further comprises:

at least one sensitivity to natural phenomena;

a schedule of the at least one activity; and at least one geographic location of the at least one activity.

23. The computer data signal of claim 18, wherein the portion is text data.

24. A computer-readable medium having stored thereon a data structure comprising:

a first field containing data representing a subscriber data structure; and a second field containing data representing a natural-phenomenological data structure particular to a subscriber identified by the first field.

25. The computer-readable medium as in claim 24, wherein the subscriber data structure is a pointer to a subscriber object.

26. The computer-readable medium as in claim 24, wherein the natural-phenomenological data structure is a pointer to a natural-phenomenological object.

27. A data structure having stored thereon a person data structure comprising:

a person type field containing data representing an identifier of a particular person;

a natural-phenomenological-preference data structure containing data representing at least one natural-phenomenological-preference for the particular person identified by the person type field; and a family data structure containing data representing a family for the particular person identified by the person type field; and an calendar data structure containing data representing a calendar for the particular person identified by the person type field.

28. The data structure of claim 27 wherein the natural-phenomenological-preference data structure further comprises:

a natural-phenomenological-preference type field containing data representing an identifier of a particular natural-phenomenological-preference;

at least one natural-phenomenological-knowledge data structure containing data representing natural-phenomenological-knowledge for the natural-phenomenological-preference identified by the preference type field;

a forecast data structure containing data representing forecast for the natural-phenomenological-preference identified by the preference type field;

a gridded data structure containing data representing gridded-data for the natural-phenomenological-preference identified by the preference type field;

a metar data structure containing data representing metar for the natural-phenomenological-preference identified by the preference type field;

a severe data structure containing data representing severe for the natural-phenomenological-preference identified by the preference type field;

a radar data structure containing data representing radar for the natural-phenomenological-preference identified by the preference type field; and a clouds data structure containing data representing clouds for the natural-phenomenological-preference identified by the preference type field.

29. The data structure of claim 27, wherein the family data structure further comprises:

an spouse field containing data representing a spouse for the particular family identified by the family type field;

a children field containing data representing a plurality of children for the particular family identified by the family type field; and a natural-phenomenological-preference data structure containing data representing natural-phenomenological-preference for the particular family identified by the family type field.

30. The data structure of claim 29 wherein the natural-phenomenological-preference data structure further comprises:

a natural-phenomenological-preference type field containing data representing an identifier of a particular natural-phenomenological-preference;

at least one natural-phenomenological-knowledge data structure containing data representing natural-phenomenological-knowledge for the natural-phenomenological-preference identified by the preference type field;

a forecast data structure containing data representing forecast for the natural-phenomenological-preference identified by the preference type field;

a gridded data structure containing data representing gridded-data for the natural-phenomenological-preference identified by the preference type field;

a metar data structure containing data representing metar for the natural-phenomenological-preference identified by the preference type field;

a severe data structure containing data representing severe for the natural-phenomenological-preference identified by the preference type field;

a radar data structure containing data representing radar for the natural-phenomenological-preference identified by the preference type field; and a clouds data structure containing data representing clouds for the natural-phenomenological-preference identified by the preference type field.

31. The data structure of claim 27, wherein the calendar data structure further comprises:

a calendar type field containing data representing an identifier of a particular calendar; and a day data structure containing data representing a plurality of days for the particular calendar identified by the calendar type field.

32. The data structure of claim 31, wherein the day data structure field further comprises:

a day type field containing data representing an identifier of a particular day; and a natural-phenomenological-preference data structure containing data representing natural-phenomenological-preference for the particular day identified by the day type field.

33. The data structure of claim 32 wherein the natural-phenomenological-preference data structure further comprises:

a natural-phenomenological-preference type field containing data representing an identifier of a particular natural-phenomenological-preference;

at least one natural-phenomenological-knowledge data structure containing data representing natural-phenomenological-knowledge for the natural-phenomenological-preference identified by the preference type field;

a forecast data structure containing data representing forecast for the natural-phenomenological-preference identified by the preference type field;

a gridded data structure containing data representing gridded-data for the natural-phenomenological-preference identified by the preference type field;

a metar data structure containing data representing metar for the natural-phenomenological-preference identified by the preference type field;

a severe data structure containing data representing severe for the natural-phenomenological-preference identified by the preference type field;

a radar data structure containing data representing radar for the natural-phenomenological-preference identified by the preference type field; and a clouds data structure containing data representing clouds for the natural-phenomenological-preference identified by the preference type field.

34. The data structure as in claim 33, wherein the natural-phenomenological-knowledge data structure further comprises:

a natural-phenomenological-knowledge type field containing data representing an identifier of a particular natural-phenomenological-knowledge;

a base-activity data structure containing data representing at least one base-activity for the natural-phenomenological-knowledge identified by the natural-phenomenological-knowledge type field; and a weather-effects data structure containing data representing weather effects for the natural-phenomenological-knowledge identified by the natural-phenomenological-knowledge type field.

35. The data structure as in claim 34, wherein the base-activity data structure further comprises:

a base-activity type field containing data representing an identifier of a particular base-activity;

an index field containing data representing an index for the particular base-activity identified by the base-activity type field;

a name field containing data representing a name for the particular base-activity identified by the base-activity type field;

a description field containing data representing a description for the particular base-activity identified by the base-activity type field; and a discretionary-comment field containing data representing a discretionary-comment for the particular base-activity identified by the base-activity field.

36. A data structure having stored thereon a preference data structure comprising:

a preference type field containing data representing an identifier of a particular preference;

a sensitivity data structure containing data representing a sensitivity for the particular preference identified by the preference type field;

a geographic-location data structure containing data representing a geographic-location for the particular preference identified by the preference type field;

a season data structure containing data representing a season for the particular preference identified by the preference type field; and a base-activity data structure containing data representing a base-activity for the particular preference identified by the name type field.

37. The data structure as in claim 36, wherein the geographic-location data structure further comprises:

a geographic-location type field containing data representing an identifier of a particular geographic-location;

an longitude field containing data representing a longitude for the particular geographic-location identified by the geographiclocation type field;

a latitude field containing data representing a latitude for the particular geographic-location identified by the geographic-location type field;

a name field containing data representing a name for the particular geographic-location identified by the geographic-location type field; and a radius field containing data representing a radius for the particular geographic-location identified by the name type field.

38. The data structure as in claim 36, wherein the base-activity data structure further comprises:

a base-activity type field containing data representing an identifier of a particular base-activity;

an index field containing data representing an index for the particular base-activity identified by the base-activity type field;

a name field containing data representing a name for the particular base-activity identified by the base-activity type field;

a description field containing data representing a description for the particular base-activity identified by the base-activity type field; and a discretionary-comment field containing data representing a discretionary-comment for the particular base-activity identified by the base-activity field.

39. The data structure of claim 36, wherein the preference type field identifies a natural-phenomenological-preference data structure.

* * * * *

UNITED STATES PATENT AND TRADEMARK OFFICE
CERTIFICATE OF CORRECTION

PATENT NO. : 6,360,172 B1
DATED : March 19, 2002
INVENTOR(S) : Craig R. Burfeind, Douglas P. Kruhoeffer, Anthony W. Meys and Peter Resch It is certified that error appears in the above-identified patent and that said Letters Patent is hereby corrected as shown below:

<u>Title page,</u>
Item [56], References Cited, OTHER PUBLICATIONS,
Delete "Observation" and insert -- Observations --, therefor.

Signed and Sealed this

First Day of October, 2002

*Attest:*

*Attesting Officer*

JAMES E. ROGAN
*Director of the United States Patent and Trademark Office*